US012325041B2

(12) United States Patent
McShane et al.

(10) Patent No.: US 12,325,041 B2
(45) Date of Patent: Jun. 10, 2025

(54) SYSTEM AND METHOD FOR ELECTROSTATIC COATING

(71) Applicant: PowderCoil Technologies, LLC, Crown Point, IN (US)

(72) Inventors: Robert McShane, Evergreen Park, IL (US); Alex Duchak, Frankfort, IL (US); Steve Murray, Roselle, IL (US); Jeremy Murray, Roselle, IL (US); Parakh Kantawala, Chicago, IL (US)

(73) Assignee: PowderCoil Technologies, LLC, Crown Point, IN (US)

( * ) Notice: Subject to any disclaimer, the term of this patent is extended or adjusted under 35 U.S.C. 154(b) by 125 days.

(21) Appl. No.: 17/976,549

(22) Filed: Oct. 28, 2022

(65) Prior Publication Data

US 2023/0136624 A1 May 4, 2023

Related U.S. Application Data

(60) Provisional application No. 63/334,326, filed on Apr. 25, 2022, provisional application No. 63/272,725, filed on Oct. 28, 2021.

(51) Int. Cl.
*B05B 7/14* (2006.01)
*B05B 5/03* (2006.01)
(Continued)

(52) U.S. Cl.
CPC .............. *B05B 5/032* (2013.01); *B05B 5/087* (2013.01); *B05B 14/42* (2018.02); *B05B 14/45* (2018.02);
(Continued)

(58) Field of Classification Search
None
See application file for complete search history.

(56) References Cited

U.S. PATENT DOCUMENTS 3,724,416 A * 4/1973 Diamond ................ B05B 14/48 55/284
4,069,974 A 1/1978 Zawacki
(Continued)

FOREIGN PATENT DOCUMENTS

JP 09-290182 A 11/1997

OTHER PUBLICATIONS

International Search Report and Written Opinion filed in PCT/US2022/048272; dated Mar. 2, 2023; 8 pgs.
(Continued)

*Primary Examiner* — Binu Thomas
(74) *Attorney, Agent, or Firm* — Vedder Price P.C.

(57) ABSTRACT

The present invention generally relates to an electrostatic coating system for spraying a stream of particles onto a medium, and in particular to a system comprising one or more apparatuses equipped with a powder coating suspension device. What is also contemplated is the use of a powder management system configured to supply predetermined powdered and air mixtures to the apparatus and a controller configured to adjust parameters of operation of both the apparatus and the powder management system. The present disclosure relates to an in-line industrial device able to coat paint, starch, thermoplastic materials, or any other powder material onto a medium by successively controlling a plurality of parameters.

16 Claims, 26 Drawing Sheets

(51) Int. Cl.

| | |
|---|---|
| ***B05B 5/08*** | (2006.01) |
| ***B05B 5/14*** | (2006.01) |
| ***B05B 14/42*** | (2018.01) |
| ***B05B 14/45*** | (2018.01) |
| ***B05B 14/48*** | (2018.01) |
| ***B05D 1/06*** | (2006.01) |
| ***B05D 3/02*** | (2006.01) |

(52) U.S. Cl.

CPC ................ *B05B 14/48* (2018.02); *B05D 1/06* (2013.01); *B05D 3/0272* (2013.01); *B05B 5/14* (2013.01); *B05B 7/1486* (2013.01)

(56) References Cited

U.S. PATENT DOCUMENTS

| | | | | |
|---|---|---|---|---|
| 4,526,804 | A * | 7/1985 | Escallon | B05B 7/1477 427/195 |
| 5,567,468 | A | 10/1996 | Lucas | |
| 7,626,602 | B2 | 12/2009 | McShane | |
| 8,269,807 | B2 | 9/2012 | McShane | |
| 2004/0043145 | A1 * | 3/2004 | Browning | B05B 14/48 118/308 |
| 2005/0126476 | A1 * | 6/2005 | Shutic | B05B 14/48 118/308 |
| 2010/0079570 | A1 | 4/2010 | McShane | |

OTHER PUBLICATIONS

International Preliminary Report on Patentability and Written Opinion filed in PCT/US2022/048272; dated May 10, 2024; 7 pgs.

* cited by examiner

SYSTEM AND METHOD FOR ELECTROSTATIC COATING

CROSS-REFERENCE TO OTHER APPLICATIONS

This application claims the benefit of and priority to U.S. Provisional Application Nos. 63/272,725 filed Oct. 28, 2021 and 63/334,326 filed Apr. 25, 2022, the content of which is hereby incorporated by reference.

FIELD OF THE INVENTION

The present invention generally relates to a system for applying an electrostatic coating to a medium, and in particular to one or more apparatuses for spraying a stream of particles onto multiple surfaces of a medium, wherein the apparatus is equipped with a dual-chamber enclosure or with a plurality of variable openings for successive layer coating onto a medium.

BACKGROUND OF THE INVENTION

During the industrial coating process, a wide variety of media are covered with different surface materials. For example, paper may be covered with starch solutions for improved heat resistance characteristics, and metal sheeting may be coated with paint or latex for aesthetic value or corrosion protection of oxidizing surfaces. The coating of materials on media is widely used in the industry, and improved, cost-effective apparatuses, methods, and devices are continuously sought. The coating of liquids may utilize volatile solvents and require drying processes that create gas wastes requiring treatment. Apparatuses and methods for applying coating material in powder form to a medium do not suffer from the above shortcomings. Powders must adhere temporarily to the medium and be uniformly spread to prevent bumps or cause problems during post-treatment operations. Once applied to a medium, powders may require post-treatment operations such as baking to fix the powder permanently on the surface.

One of the known ways to adhere a powder to a surface without adding unnecessary agents or adhesives is by using the electrostatic adhering capacity of a charged stream of particles made from a powder suspended in a gas and placed in contact with a medium that has a different electrical energy or is grounded. The Law of Coulomb provides that electrostatic force felt by two bodies charged with the same polarity charge is a repulsive force, and the force felt by two bodies charged with opposite polarity is an attractive force. Once the powder particles in a stream are charged, either by removing or adding surface electrons, the particles are then drawn by the electromagnetic force to a grounded medium in proportion to Coulomb's Law. Another advantage of electrostatic charging of a stream of particles is the creation of repulsion forces between neighboring particles in the stream placed at equivalent energy to aid in the spatial distribution of the particles within the stream of particles. Additionally, charged particles are drawn by a stronger electrostatic force on a surface where other particles have not yet attached.

Electrostatic charges can be placed on a medium by contact electrification, triboelectric electrification, or physical rubbing of surfaces such as the friction of a balloon on a piece of clothing or the displacement of shoes over a carpet. Another way to create an electrical charge on an item is to circulate the item in a strong electrical field in excess of the breakdown strength of air, a field of such intensity that ionized particles are formed. These ions are collected on the surface of the item in the corona discharge zone around a conductor by moving the powder through the corona region. These particles exit the corona superficially charged with an ionic charge and are then vulnerable, due to their low mass, to electrostatic forces created by their charge. Particles of both conductive material and insulating material are vulnerable to corona charging. Nonconductive particles, since they are less likely to redirect the position of superficial ionic charges, are more likely to maintain their newly gained electrostatic charge.

Existing approaches to applying coatings include spraying a fine powder made of a material such as epoxy, polyester, polyurethane, or nylon that is electrostatically applied to a medium or substrate comprising a metal or other material that is grounded. After being applied, the powder is heated to cure and harden, generally in an oven.

Additionally known is the use of a high-level energy conductor located at the source of a stream of particles to ionize the powder or the use of a highly charged and dangerous conductive net structure placed in proximity to a medium. What is also known is the use of a chamber wherein the medium and the conductor are placed in contact with particles in the closed environment, or the use of an enclosure where ionized particles are collected after being placed in proximity to a conductor in a small enclosure before the ionized particle flow is directed onto a medium outside the enclosure. Drawbacks of these known technologies include the creation of corona discharges between the conductor surrounding low-level charge elements located in close proximity to the source of powder particles, the need to place the conductor in the path of the stream of particles, the creation of enclosed devices where high-level voltage must be managed, and distribution systems where the particles are not suspended in the air sufficiently enough to offer an optimal collection of the ions in the air. Although many of these devices are able to perform their intended functions in a workmanlike manner, none of them adequately addresses the combination of these drawbacks.

Further, existing systems and methods generally are either unable to apply a coating to multiple surfaces of a medium or require multiple passes to accomplish a desired coating. What is needed is an improved apparatus able to adequately fluidize the particles from a powder source and place them in a particle stream, an apparatus where conductors are protected and offset from the particle stream, an apparatus able to uniformly deposit the particles onto a medium, an apparatus able to avoid overspray and recover particles not deposited on the medium, and an apparatus able to (alone or jointly) coat multiple surfaces of a medium. Further control systems able to monitor and adjust the stream of particles in real time is desirable to ensure a specified coating is adequately applied. The present invention solves these and many other problems associated with currently available apparatuses for electrostatic coating.

SUMMARY

The present invention generally relates to a system for applying an electrostatic coating to a medium, and in particular to a system comprising one or more electrostatic coating apparatuses for spraying a stream of particles onto a medium. In embodiments, the one or more apparatuses include a multivolume chamber coupled to a volute for mixing and spreading the stream of particles before they are distributed by one or more electrostatic emitters. In embodiments, discrete width control mechanisms are used to restrict the size of the particle spray and a rotational control mechanism permits the electrostatic emitters to rotate to finely tune the electrostatic field applied to the particle stream. In embodiments, a powder reclamation system operates to reclaim overspray and other particles that do not adhere to the medium, allowing particles to be collected, filtered, and recycled for subsequent reuse. The particle stream is deposited onto a medium moving past the electrostatic emitters. In embodiments, a shroud surrounds the medium and the emitters to ensure the particle stream is contained (making it available for easy reclamation and preventing particles from escaping the system).

The present disclosure relates to an in-line industrial device able to apply paint, starch, thermoplastics or any other powder material onto a medium by successively controlling a plurality of parameters, including the above-mentioned novel features, such as (but not limited to), in various embodiments, the size of an inside aperture within the enclosure, the rotation or angle of the electrostatic emitters, the speed of the medium moving between the electrostatic emitters, the powder velocity/flow rate, the pressure in the powder lines, the change in the flow of input gas, the change in the voltage or the location of the conductor, the measured film thickness applied to the medium previously, the weight of powder delivered, the powder blower speed, the oven temperature, the vacuum flow rate, the excess air flow rate, temperature in various components of the apparatus, ambient temperature, measured pressure at various locations in the apparatus, and the weight of reclaimed powder.

BRIEF DESCRIPTION OF THE DRAWINGS

The features of the present disclosure are believed to be novel and are set forth with particularity in the appended claims. The disclosure may be best understood by reference to the following description taken in conjunction with the accompanying drawings. The figures that employ like reference numerals identify like elements.

DETAILED DESCRIPTION

Figure 1A:
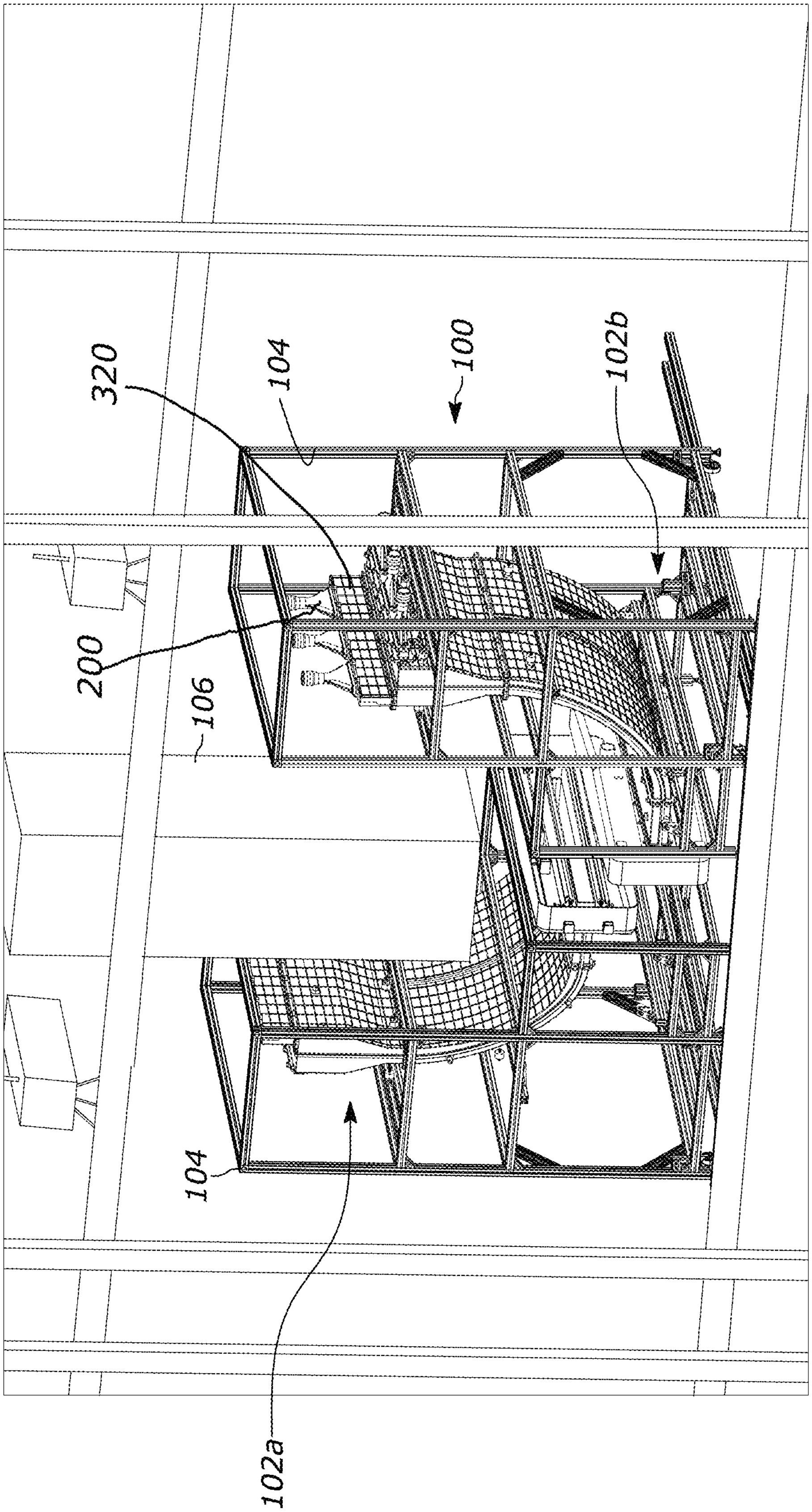
FIG. 1*a* is a front perspective view of an electrostatic coating system with the enclosure panels removed.

In the following detailed description, reference is made to the accompanying drawings that show, by way of illustration, a possible industrial embodiment of the disclosure centered around an improved electrostatic coating apparatus. This embodiment is described with detail sufficient to enable one of ordinary skill in the art to practice the disclosure. It is understood that each subfeature or element described in this embodiment of the disclosure, although unique, is not necessarily exclusive and can be combined differently and in a plurality of other possible embodiments because they show novel features. It is understood that the location and arrangement of individual elements, such as geometrical parameters within each disclosed embodiment, may be modified without departing from the spirit and scope of the disclosure. In addition, this disclosed embodiment can be modified based on a plurality of industrial and commercial necessities, such as, in a nonlimiting example, a large-scale coating process where several units are required at different locations along a production line or in a confined area when the atmospheric control of the stream of particles is to be recycled. The disclosed apparatus can be modified according to known design parameters to implement this disclosure within these specific types of operation. Other variations will also be recognized by one of ordinary skill in the art. The following detailed description is, therefore, not to be taken in a limiting sense.

Electrostatic Coating System

The present disclosure relates to an electrostatic coating system 100 and its component parts as shown in FIGS. 1*a*-21. The electrostatic coating system 100 includes a first electrostatic apparatus 102*a* (or top-coating apparatus) for coating a top surface of a medium 1502 (omitted from FIGS. 1*a* and 1*b* for clarity) that is offset vertically from a second electrostatic apparatus 102*b* (or bottom-coating apparatus) for coating a bottom surface of a medium 1502. This offset prevents interference between the electrostatic fields generated by each apparatus. As will be clear to one of ordinary skill in the art, other arrangements could also be employed. In an embodiment (not shown), the top-coating apparatus 102*a* and the bottom-coating apparatus 102*b* are aligned (which may be preferable for use cases in which greater space savings are desired or electrostatic interference is not problematic).

In the embodiment shown, the medium 1502 is contemplated as being a material having a top side and a bottom side. In an embodiment, the medium 1502 is a metal sheet. Other configurations of materials (which may necessitate additional apparatuses) are also contemplated. In the embodiment shown, the medium 1502 is passed vertically between the top-coating apparatus 102*a* and the bottom-coating apparatus 102*b*. Uncoated material is first sprayed by the bottom-coating apparatus 102*b* before being sprayed by the top-coating apparatus 102*a*. The coated material is then passed through the oven 106 for curing.

The oven 106 heats the coated material to a temperature range of about 400 to 550 degrees to treat the coating and improve chemical resistance, improve resistance to harsh environmental conditions, and maintain color stability.

Figure 1B:
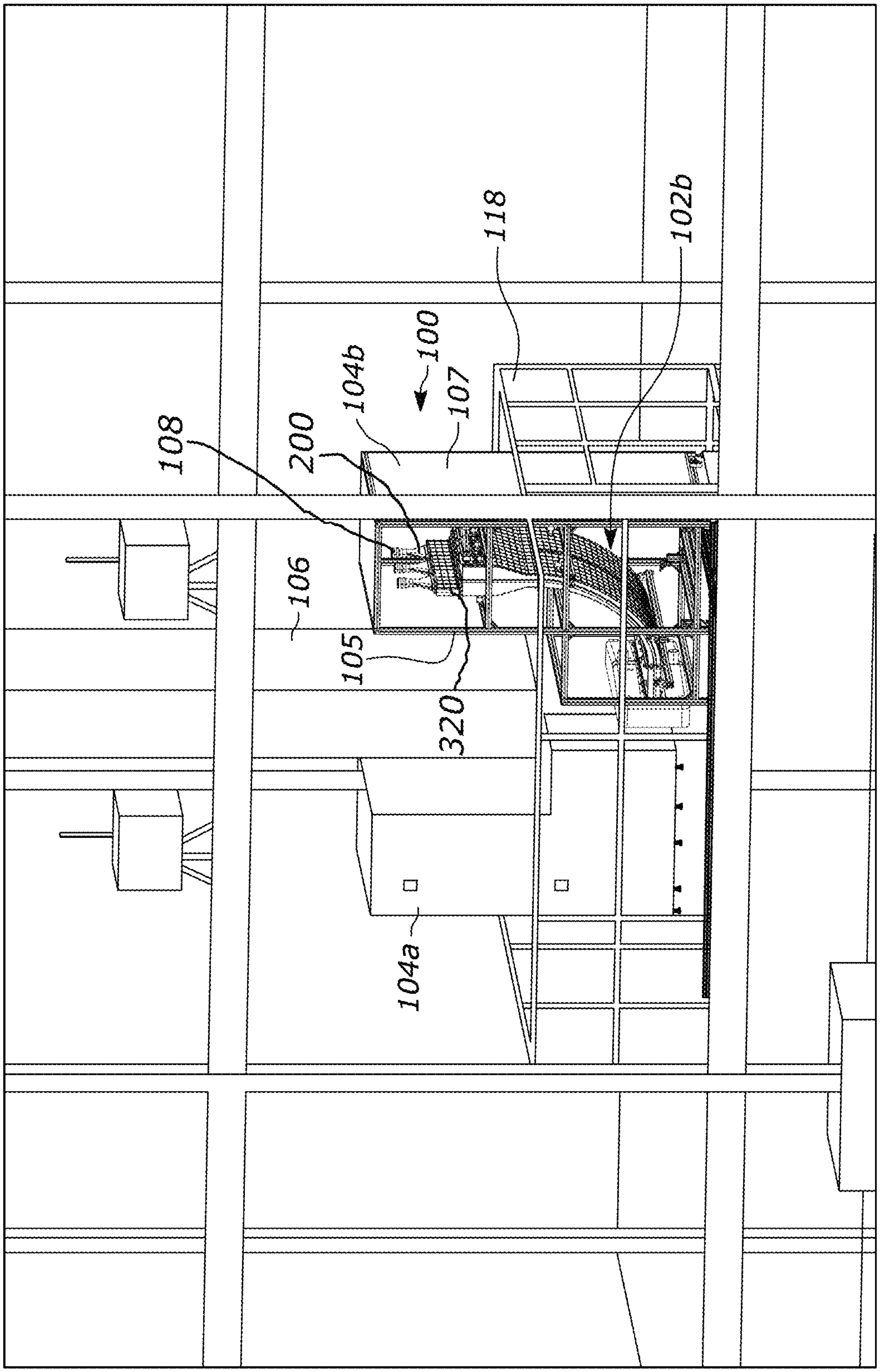
FIG. 1B is a front view of the electrostatic coating system of FIG. 1*a* with the enclosure panels in place on a first apparatus and partially removed from a second apparatus.

While FIGS. 1*a* and 1*b* contemplate a vertically oriented medium 1502 (shown in FIG. 15) grounded to earth passing between the pair of electrostatic coating apparatuses 102*a*, 102*b*, the electrostatic coating system 100 may be placed in any orientation resulting in a medium 1502 also oriented in any orientation. One of ordinary skill in the art understands that the medium 1502 may be a linear, rigid strip of material or a rolled medium 1502 which is unfolded before passing through the electrostatic coating system 100 before again being rolled, folded, or stored. It is also understood that any type of medium 1502, made of any type of conductive or nonconductive material and presenting a variety of surface geometry and topology, can be coated. While in a preferred embodiment (shown) the medium 1502 is grounded using conventional grounding techniques, the electrostatic coating system 100 functions on attractive forces created between the powder particles and the medium 1502 by creating a difference in ionic potential, so what is contemplated is the use of a medium 1502 at any ionic potential sufficiently different from the average ionic potential of the particles emitted by the electrostatic coating system 100 to induce electrostatic attraction forces.

In the embodiment shown, the top-coating apparatus 102*a* is substantially identical in structure to the bottom-coating apparatus 102*b*. The enclosures 104*a*, 104*b* are depicted in FIGS. 1*a* and 1*b* as an open frame. In other examples, the enclosures 104*a*, 104*b* has a solid exterior. In an embodiment, enclosures 104*a*, 104*b* are NEMA-4 enclosures that house pneumatic controls and powder supplies for the apparatus.

The components of each apparatus 102*a*, 102*b* are made of a thick wall of strength sufficient to contain internal pressures created during the process of suspending the powder particles within a gas, also known as fluidization of the particles. FIGS. 1*a* and 1*b* show one possible industrial and commercial embodiment of the invention. These figures show a stainless steel casing with surface strengtheners described in detail hereinafter. The fluidization process includes the use of a pump (not shown) that supplies pressurized air to each apparatus 102 through a plurality of mini manifolds 200, each having a respective air inlet 108. Each apparatus 102 also comprises a plurality of mini manifolds 200 each having a powder inlet 110 connected to a plurality of powder supply lines. Each apparatus 102 discharges a controlled volume of particles in a powder form to be coated on the medium 1502.

Figure 2A:
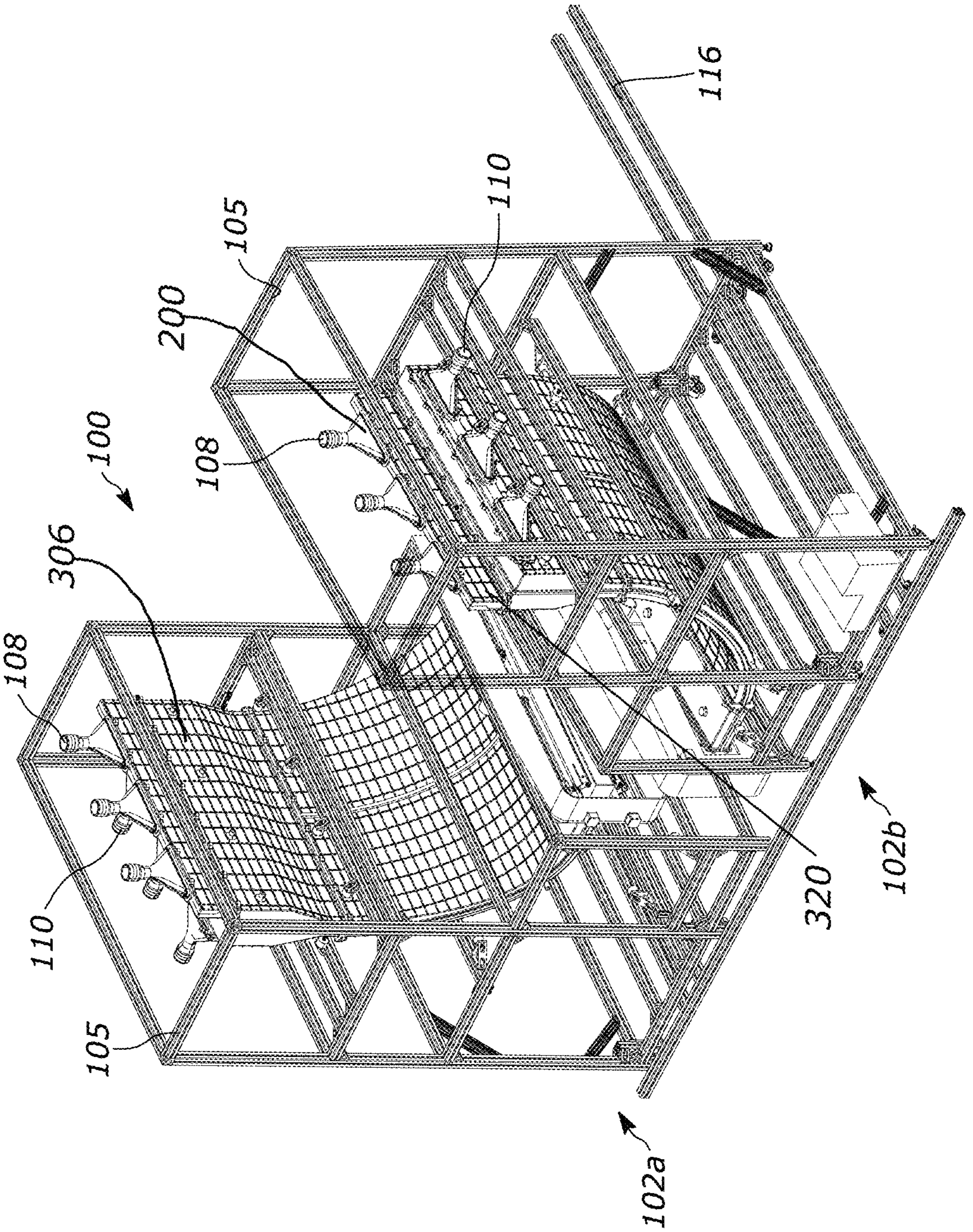
FIGS. 2*a* and 2*b* are perspective views of the electrostatic coating apparatuses (without enclosure panels) removed from the other components of the electrostatic coating system of FIG. 1*a;*
Figure 2B:
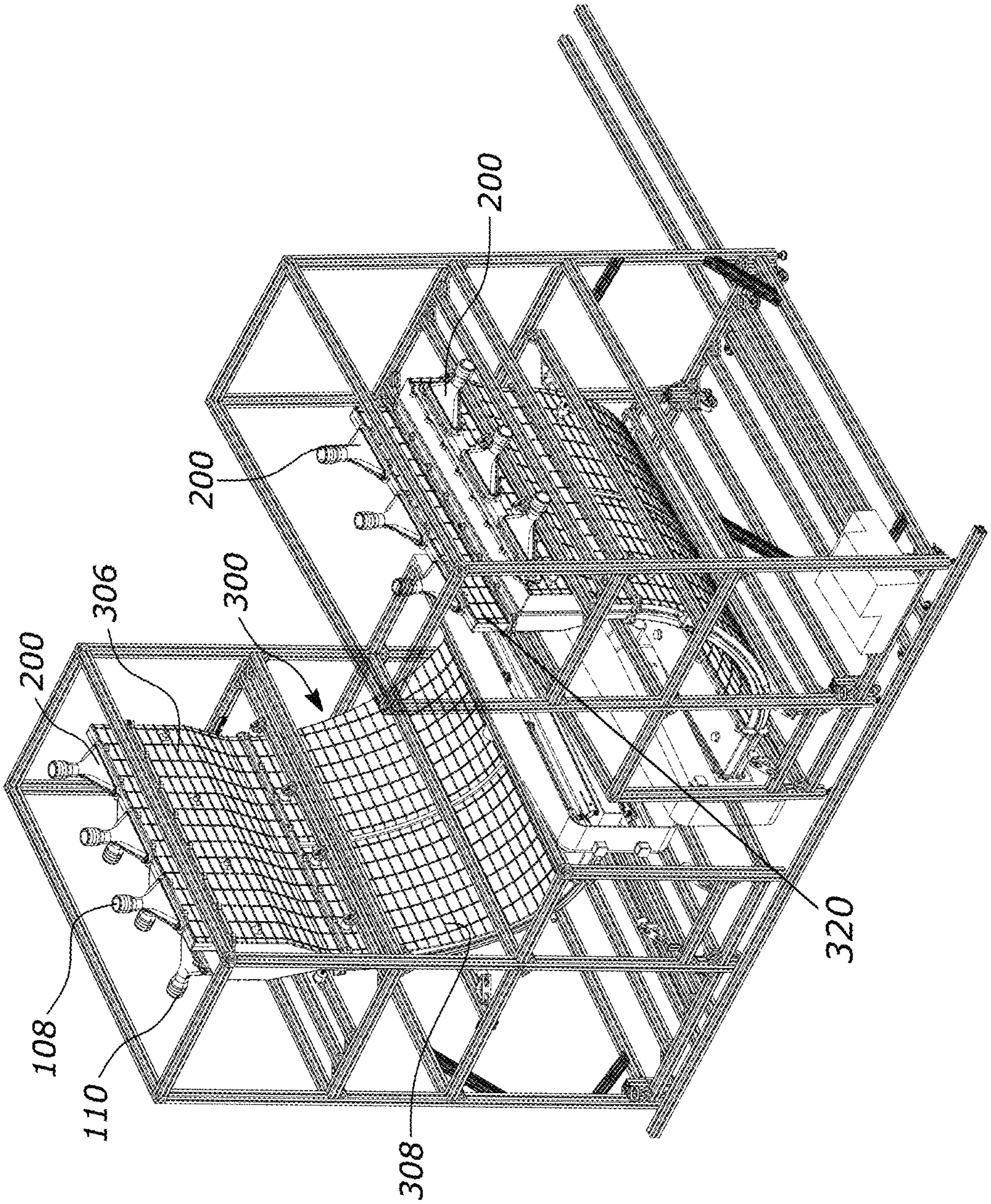

As shown in FIGS. 2*a* and 2*b*, in an embodiment of the electronic coating system 100, enclosures 104*a*, 104*b* comprise a solid outer surface (such as metal sheeting) which conceals the apparatus 102 within from view and protects it from physical impacts. The solid enclosures 104*a*, 104*b* are each comprised of panels 107*a*-107*f* and further serves to insulate the apparatus 102 from ambient temperature changes. In other embodiments, such as also shown in FIG. 1B, an enclosure 104*b* may be partially open to permit access to the apparatus 102*b* within while still providing some degree of physical protection. Other configurations of enclosures 104*a*, 104*b* are also contemplated. In an embodiment, the exterior surface (i.e., panels 107*a*-107*f*) of the enclosures 104*a*, 104*b* is formed from sheets of 80/20 extruded aluminum that is joined to an interior frame 105 by t-nut connectors. Each apparatus 102*a*, 102*b* is supported within the enclosures 104*a*, 104*b* by neoprene rubber isolators to reduce vibrations. In other embodiments, alternative materials or other techniques for vibration damping may be used, as will be understood by one of ordinary skill in the art. In embodiments such as that shown in FIGS. 1*a* and 1*b*, handrails 118 may surround the electrostatic coating system 100 to protect users of the system 100 and the equipment. In an embodiment, the panels 107*a-f* of the enclosures 104*a*, 104*b* are removable to allow a user to partially or fully open the enclosures 104*a*, 104*b* and access the interior of the apparatuses 102*a*, 102*b*.

FIGS. 2*a* and 2*b* depict an electrostatic coating system 100 with the solid panels 107*a*-107*f* and the enclosures 104*a*, 104*b*, respectively, removed to better illustrate the components of the apparatuses 102*a*, 102*b*. As shown, each apparatus 102*a*, 102*b* comprises a plurality of air inlets 108 and powder inlets 110 proximate the top of the apparatus 102. As shown, the apparatuses 102 are each secured to their respective frame 105 by a plurality of mounting brackets 112. These mounting brackets 112 may be made of metal and include neoprene rubber isolators, as discussed above, thereby reducing the vibration passed between each apparatus 102*a*, 102*b* and its respective frame 105.

Figure 3:
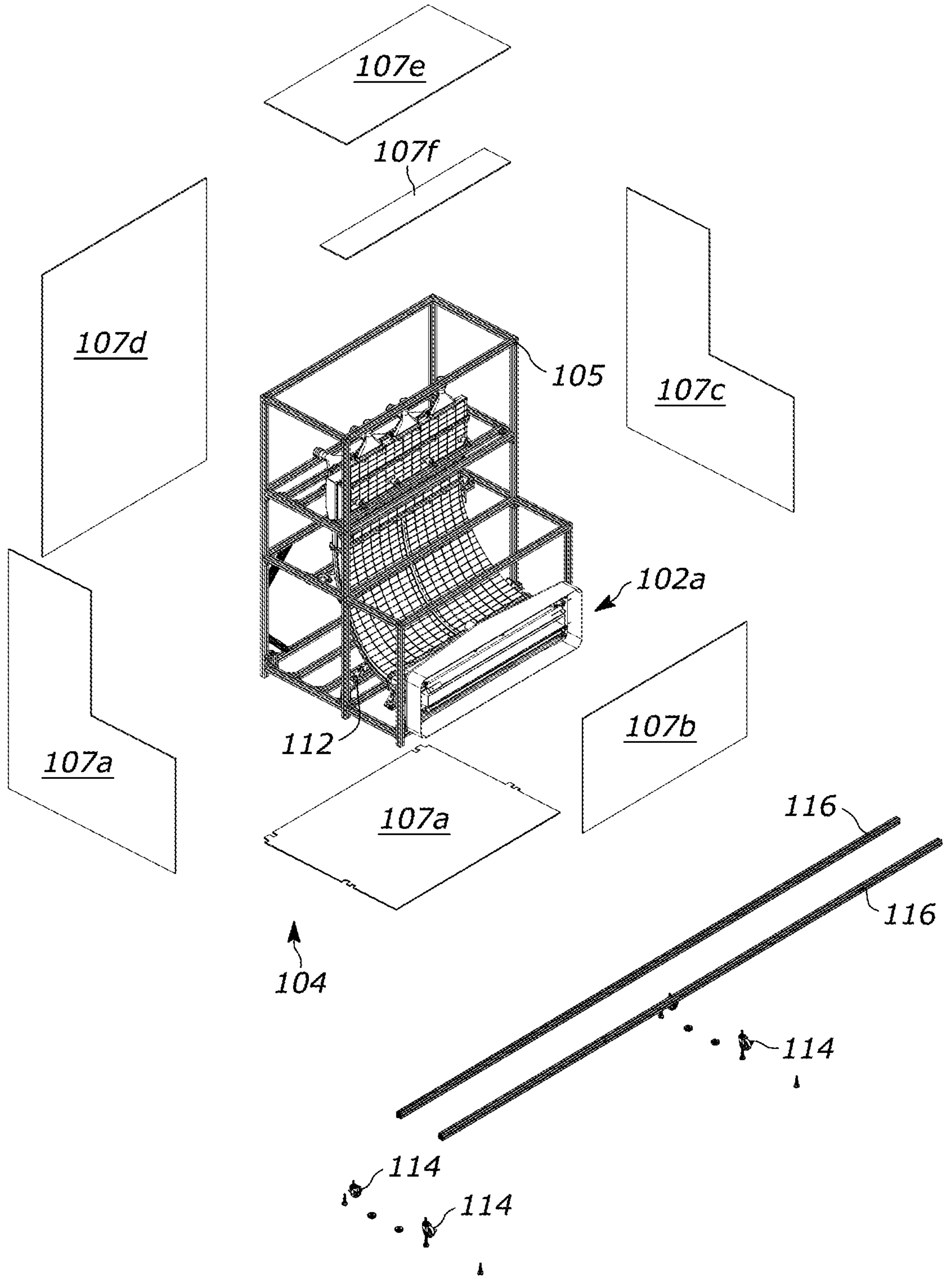
FIG. 3 is an exploded view of the enclosure panels of one of the electrostatic coating apparatus of FIG. 1*a;*
Figure 4:
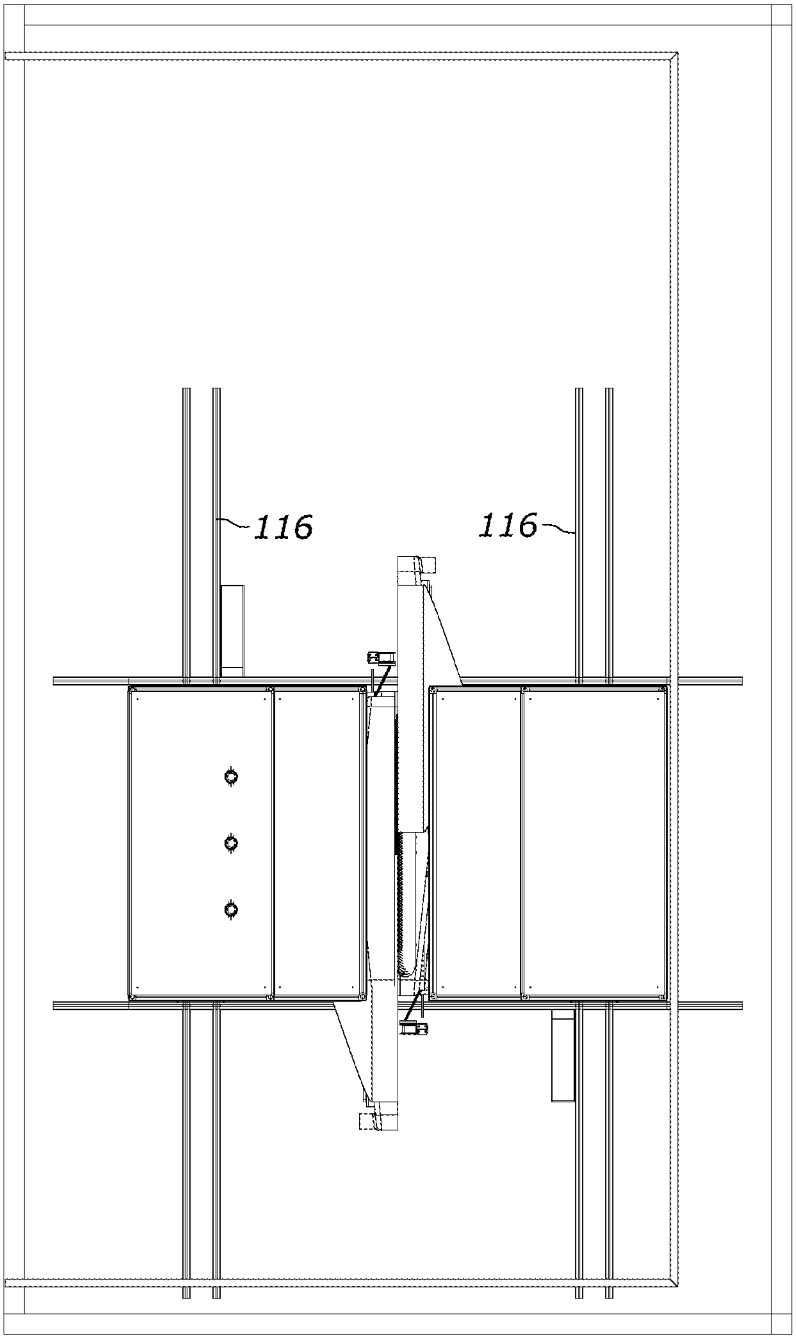
FIG. 4 is a top view of the electrostatic coating apparatuses of the system of FIG. 1.

FIG. 3 depicts an exploded view of an enclosure 104*a*, 104*b* including a bottom panel 107*a*, front panel 107*b*, pair of side panels 107*c*, back panel 107*d*, top panel 107*e*, and header panel 107*f*

Retraction of Apparatuses

Figure 5A:
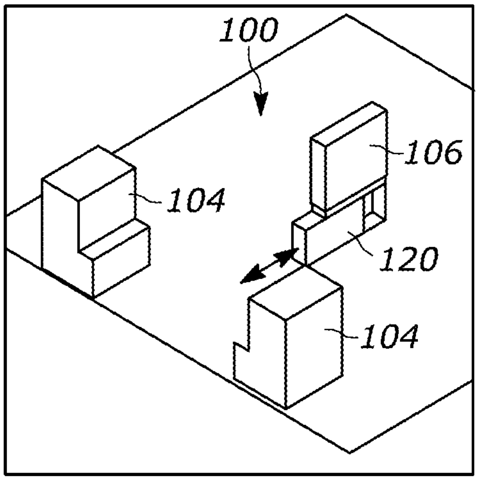
FIG. 5*a* is a perspective view of the system of FIG. 1*a* with the apparatuses retracted and the shroud partially retracted.

As shown, each apparatus 102*a*, 102*b* and its respective enclosure 104*a*, 104*b* may be supported by wheels 114 and configured to slide along rails 116 so as to permit access to the apparatuses 102*a*, 102*b* by moving it away from the oven 106. This permits each apparatus 102*a*, 102*b* and the oven 106 to be more easily inspected or maintained. As shown in FIG. 5*a*, each apparatus 104*a*, 104*b* may be slid along rails

Figure 5B:
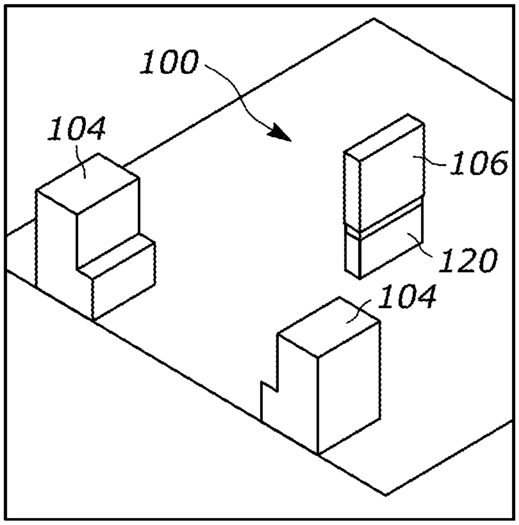
FIG. 5*b* is a perspective view of the system of FIG. 1*a* with the apparatuses retracted and the shroud in place.
Figure 5C:
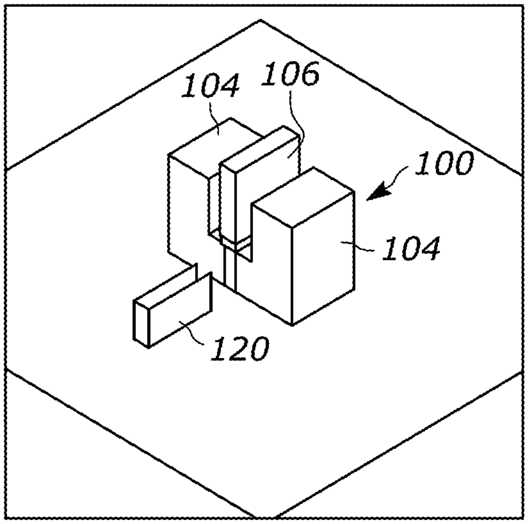
FIG. 5*c* is a perspective view of the system of FIG. 1*a* with the apparatuses in place and the shroud retracted.

116 away from the oven 106. Removably connected to the bottom of the oven 106 is a strip shroud which protects the medium 1502 and spray area from airborne dust or other contamination. Further, the strip shroud 120 may be slid away from the oven 106 to permit easier access to the oven 106 or the medium 1502 for inspection and cleaning. FIG. 5*b* depicts the electrostatic coating system 100 with the apparatuses 102*a*, 102*b* slid away from the oven 106 while the strip shroud 120 is left in place, while FIG. 5*c* depicts the electrostatic coating system 100 with just the strip shroud 120 retracted away from the oven 106 and apparatuses 102*a*, 102*b*. In an embodiment, the strip shroud 120 is a permanent structure and can flexibly index with the apparatus to prohibit fugitive powder during operation. In this alternative embodiment, the retraction of the strip shroud 120 is controlled by a pneumatic piston system, the pneumatic piston system comprising a silicone boot which provides a means for retracting the strip shroud 120 from the oven 106 and allowing a user access to the oven 106 and interior of the strip shroud.

Mini Manifolds

Figure 6A:
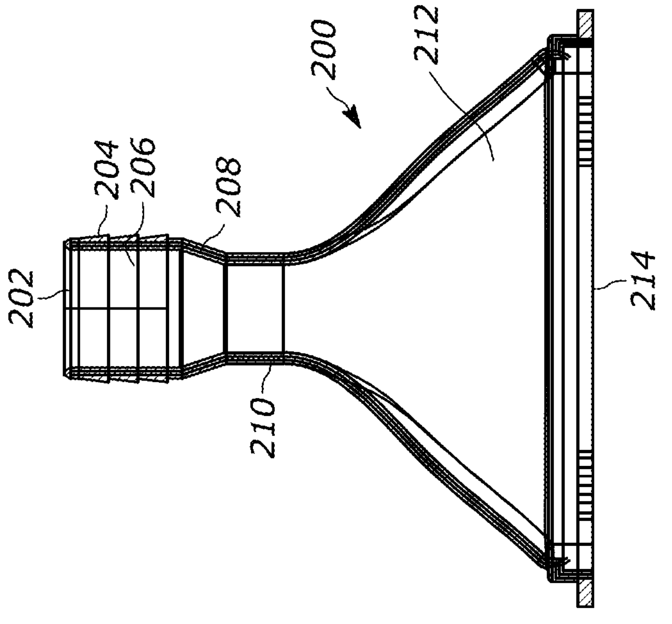
FIG. 6*a* is a front cross-sectional view of a mini manifold.
Figure 6B:
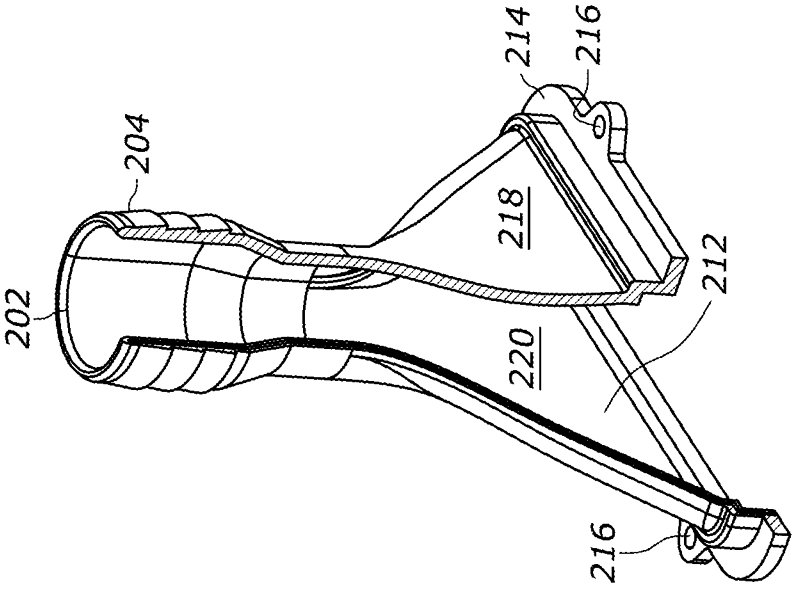
FIG. 6*b* is a partial cutaway perspective view of the mini manifold of FIG. 6*a;*
Figure 6C:
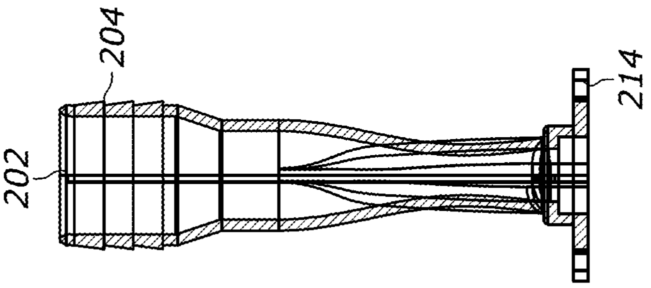
FIG. 6*c* is a side cross-sectional view of the mini manifold of FIG. 6*a;*
Figure 7:
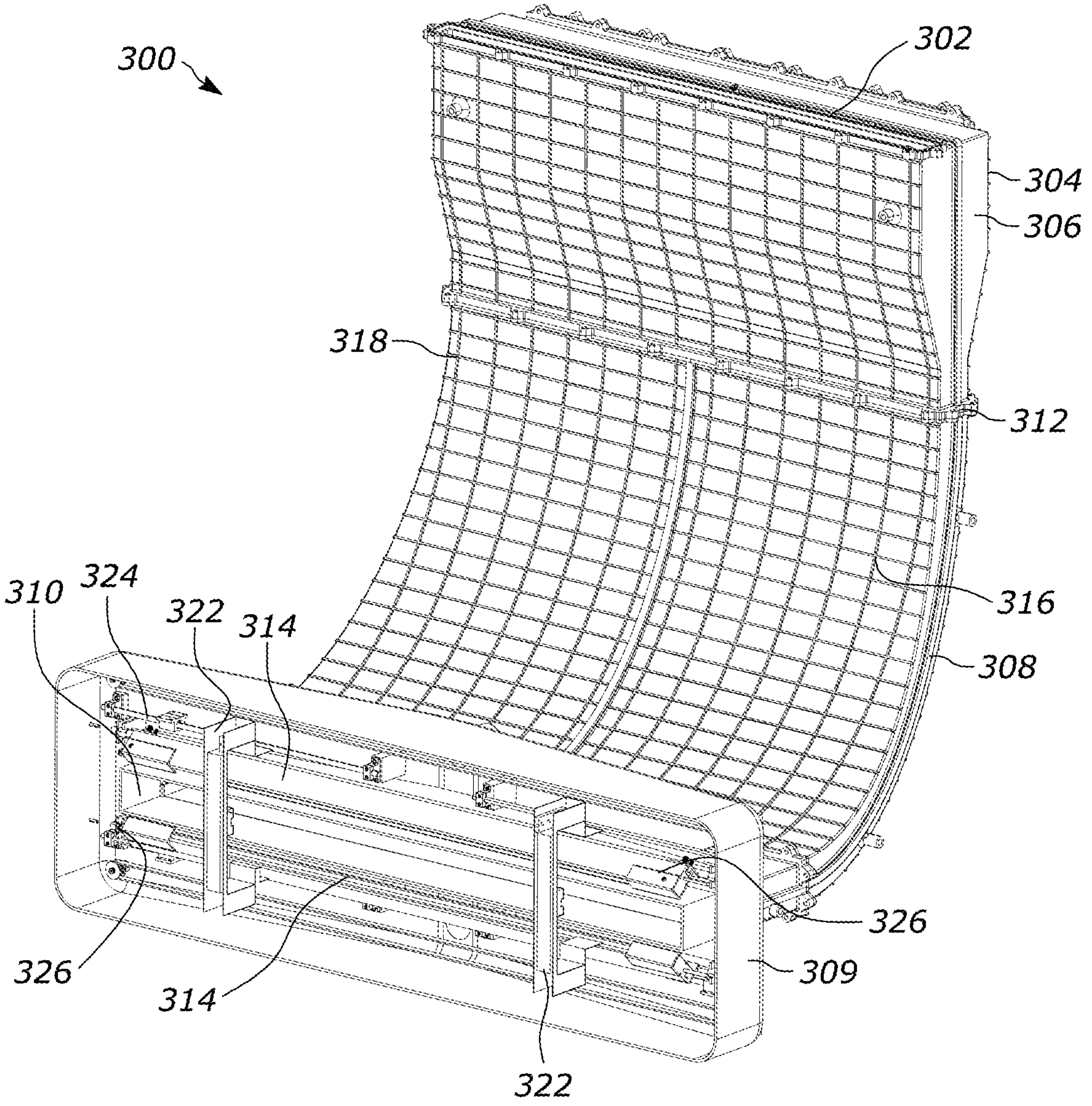
FIG. 7 is a perspective view of a multivolume chamber of an electrostatic coating apparatus of FIG. 2*a;*
Figure 8:
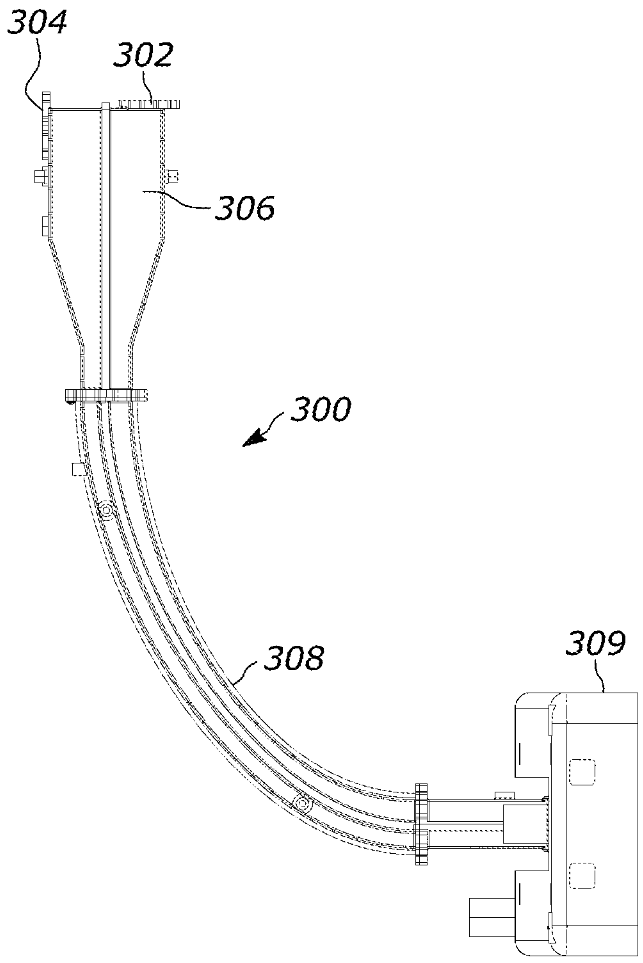
FIG. 8 is a side view of the multivolume chamber of FIG. 7.
Figure 9:
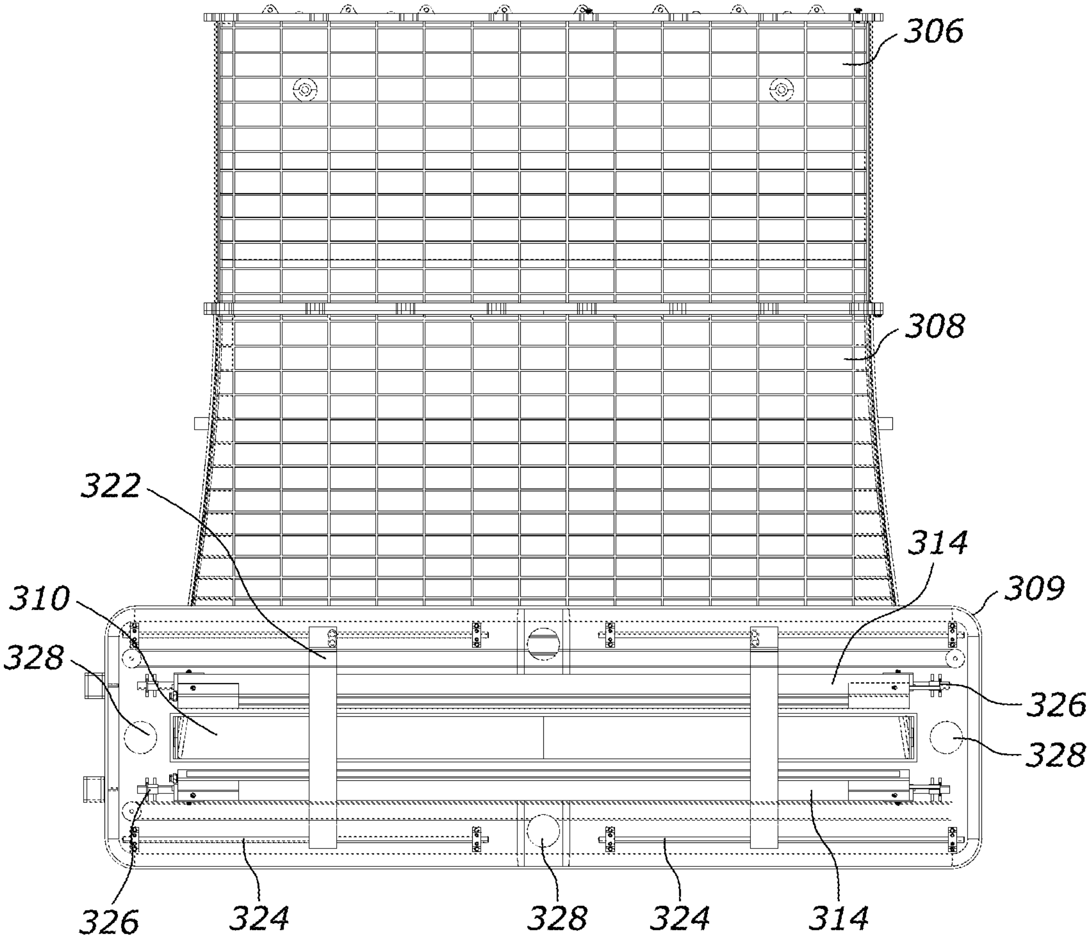
FIG. 9 is a front view of the multivolume chamber of FIG. 7.

FIGS. 6*a* through 6*c* depict various views of a mini manifold 200. Each mini manifold 200 comprises an inlet 202 that may be used as either an air inlet 108 or a powder inlet 110, depending on the configuration of the mini manifold 200. At least one inlet flange 204 forms a ring around the exterior surface 218 of the mini manifold 200 proximate the inlet 202. Particles (e.g., air or powder) pass into the mini manifold 200 from a hose (not shown) through the inlet 202 and an initial chamber 206 before being focused by a nozzle 208. Thereafter, particles pass through a straight segment 210 before expanding through the outlet 212 that is connected to the mixing chamber 306 (not shown). Each mini manifold 200 includes an outlet flange 214 with one or more holes 216 through which fasteners may secure the mini manifold 200 to the mixing chamber 306 or air extension 320.

The dimensions and shape of the mini manifold 200 is designed optimally to get an even and widespread flow of air and powder into the mixing chamber 306. To maintain the integrity of the inlets, the mini manifold 200 ensures that the flow is consistent across the length and width of the inlets. In an embodiment, the mini manifolds 200 include a threaded portion aiding in providing an even and widespread flow of air and powder into the mixing chamber 306.

The mini manifold(s) 200 may be arranged as depicted in FIG. 2*a*, with the air inlets 108 placed in a vertical orientation and the powder inlets 110 placed in a horizontal orientation. Other arrangements of mini manifold(s) 200 are also contemplated.

Chamber

FIGS. 7 through 10*b* depict a chamber 300. The chamber 300 comprises a mixing chamber 306 which receives air through a plurality of air inlets 108 in a first plurality of mini manifolds 200 and powder through a plurality of powder inlets 110 in a second plurality of mini manifolds 200. An air opening 302 located in the top of the mixing chamber 306 receives air from an air extension 320 while powder openings 304 in the back of the mixing chamber 306 receive powder from one or more mini manifolds 200. This arrangement is preferred in some embodiments as it has experimentally been demonstrated to produce an even distribution of powder and air throughout the mixing chamber 306 and volute 308. As will be clear to one of ordinary skill in the art, other arrangements of openings are also contemplated. In an embodiment, air hoses are directly connected to the mixing chamber 306 by way of one or more mini manifolds 200 without the use of an air extension 320.

In the embodiment depicted in FIGS. 1*a* through 2*b*, the air extension 320 connects to the top of the mixing chamber 306. The air extension 320 provides additional separation between the air inlets 108 and the mixing chamber 306, allowing the air to mix and flow uniformly into the mixing chamber 306 through the plurality of mini manifolds 200. Specifically, the air extension 320 controls the flow volume of conditioned air to the mixing chamber 306 to vary the thickness of the mixture of powder particles and air particles (the “mixture”). Increased air flow leads to a thinner mixture. Alternatively, decreased air flow increases the thickness of the mixture. As a result, modulation of the air flow in the air extension 320 impacts the finish and thickness of the coating applied to the surface of the medium 1502.

Air and powder are intermixed and fluidized in the mixing chamber 306 before exiting through openings (not shown) at the lower end 312 of the mixing chamber 306. The fluidized air/powder mixture then flows through the volute 308 to the electrostatic/vacuum chamber 309 and then through the outlet 310. The electrostatic/vacuum chamber 309 creates a zone of ionization which electrostatically charges the mixture. When the electrostatically charged mixture is discharged and applied to the medium 1502, the powder flows to the surface of the medium 1502 to ground the charge. Therefore, electrostatic charge helps the mixture “stick” to the surface of the medium 1502 and provides an even application of the mixture to the medium 1502. The ionized powder (having a negative charge) is attracted to the steel surface and electrostatically adheres to the surface of the medium 1502.

The exterior surface 316 of the mixing chamber 306 and volute 308 contain a plurality of ridges 318 that provide structural integrity to the chamber 300, while the interior surface is smooth and uninterrupted to ensure the fluidize powder/air mixture flows uninterrupted through the chamber 300. Excess powder (i.e., overspray) is evacuated from the electrostatic/vacuum chamber 309 through the main reclaim duct 504. In an embodiment, the electrostatic/vacuum chamber 309 comprises at least one reclaim port 502 and a diverter to control the flow of overspray.

Each outlet 310 is flanked by a pair of electrostatic emitter bar 314 each containing a plurality of electrostatic emitters (not shown) that generate the electromagnetic field to propel/discharge the fluidized powder onto the medium 1502. It is understood by one of ordinary skill in the art that emitters must be placed in a position able to maintain the electrical charge in the emitter bar 314, insulate the emitter bar 314 from surrounding elements, protect the emitter bar 314 from accidental corona discharges created by a high voltage placed on the emitters, and protect operators of the apparatus 102 from shocks. A pair of width control mechanisms 322 adjust the width of the outlet 310 by moving horizontally along a pair of rails 324 to block a portion of the outlet 310. Each electrostatic emitter bar 314 is connected to a pair of rotational control mechanisms 326 that permit the emitter bar 314 to rotate.

Figure 10A:
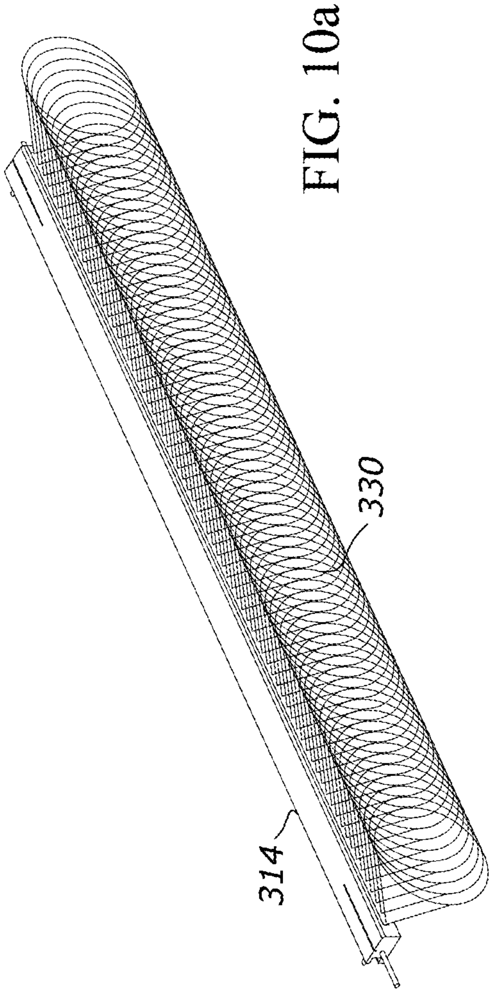
FIG. 10*a* is a perspective view of an electrostatic emitter bar generating a simulated ionization field.
Figure 10B:
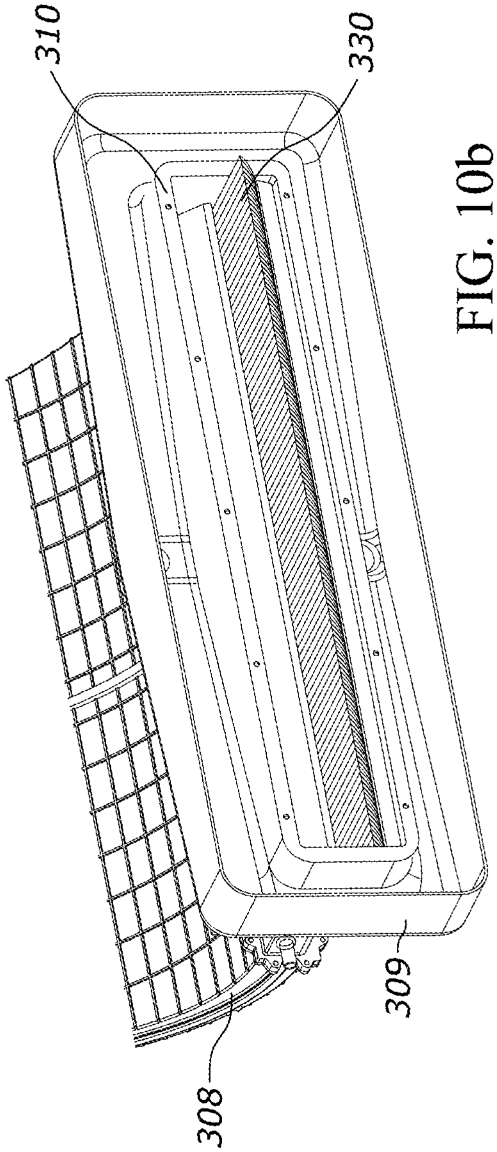
FIG. 10*b* is a perspective view of the electrostatic emitter bar generating a simulated ionization field of FIG. 10*a* in an enclosure.

FIG. 10*a* depicts a single electrostatic emitter bar 314 with a simulated ionization field 330, while FIG. 10*b* depicts the simulated ionization field 330 generated by a pair of electrostatic emitter bars 314 working in conjunction with one another. By rotating the emitter bars 314 individually, the orientation of the generated ionization field 330 may be adjusted, while varying the power supplied to each emitter bar 314 (or to individual emitters within each bar) permits the magnitude and dimensions of the ionization field 330 may be similarly controlled.

The ionization field 330 is adjustable to optimize the thickness of the mixture based on the volume of the mixture being applied to the medium 1502. By increasing or decreasing the level of ionization, the mixture will either "fully charge" or diminish in ionization. The level of ionization optimizes the charge of the mixture. In order to coat the medium 1502 in a single pass, the mixture needs to have sufficient charge. The electrostatic field 330 is optimized to result in a desired finish (or "film thickness") of coating on the medium 1502. The adjustment of film thickness is controlled by the speed of the medium 1502 as it passes through the spray area, the volume of powder applied to the medium 1502 surface, and the ionization filed 330. These elements are balanced in order to achieve a precise coating on the medium 1502 surface.

In the embodiment shown, one or more edge conditioners 328 surround the outlet 310. The edge conditioners 328 output deionized air used to condition the edges of the expelled particle spray. By surrounding the desired spray area with deionized air, the particle spray is further restricted and overspray is prevented.

Overspray Collection

Figure 11B:
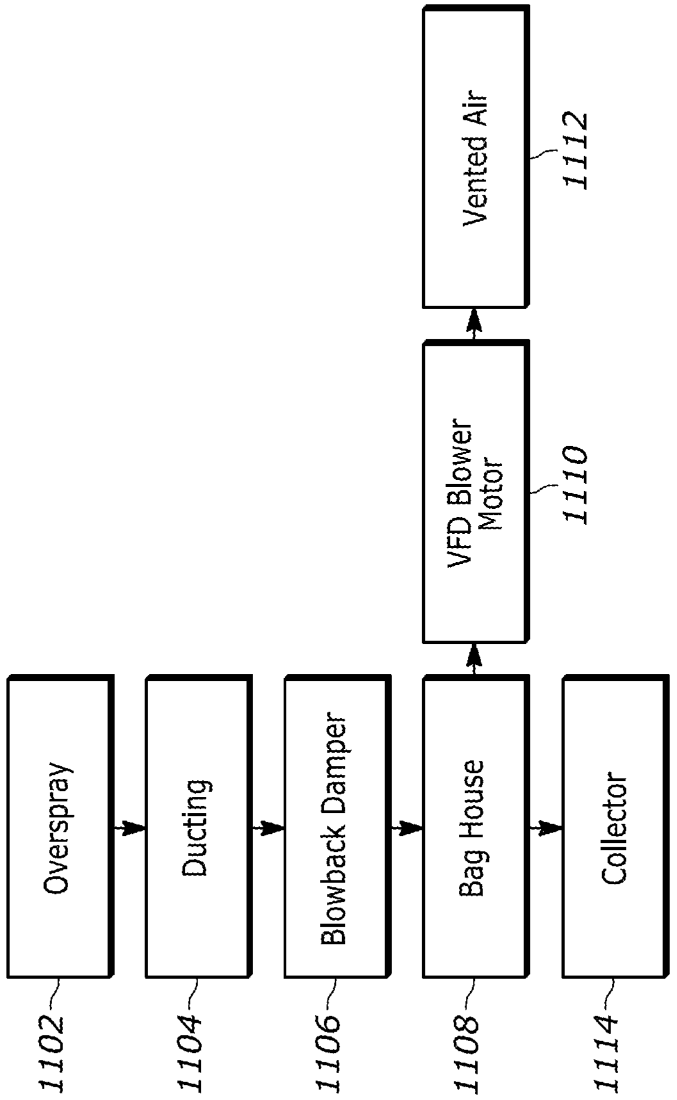
FIG. 11*b* is a process flow diagram of a second method of using an overspray collection system.
Figure 11A:
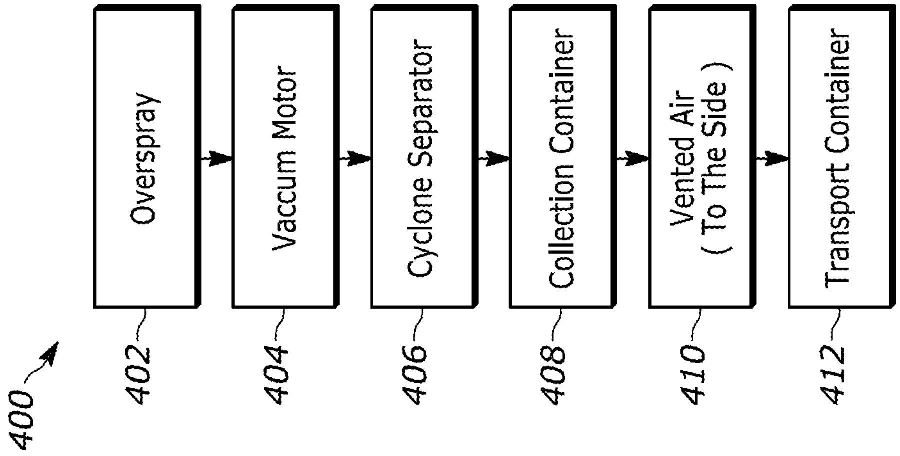
FIG. 11*a* is a process flow diagram of a method of using an overspray collection system.

FIGS. 11*a* and 11*b* depict methods 400 for collecting and recycling oversprayed powder. The elements of the overspray collection system (the "reclaim system" or "collection unit") 500 are further illustrated in FIGS. 20 and 21. In an embodiment, the reclaim system 500 functions to collect overspray from a plurality of apparatuses 102*a*, 102*b* coating multiple surfaces of a medium 1502. As will be clear to one of ordinary skill in the art, alternative arrangements are also contemplated hereby, including but not limited to having a separate reclaim system 500 for each apparatus 102.

The method 400 begins at step 402 when powder over sprays, or is not electrostatically seated on the medium 1502. At step 404, a vacuum motor in the collection unit 500 creates a low pressure area, ingesting the oversprayed powder. In an embodiment, the spray area around one or more apparatuses 102 is substantially covered by a shroud 120 to prevent overspray from escaping the area. The vacuum motor is sized such that it collects all overspray within the shroud 120. The air/powder mixture collected by the vacuum motor is then passed through a cyclone separator at step 406 wherein the air is separated from the powder. At step 408, the powder is filtered into a collection container in a solid form while the air is filtered and vented outside the shroud 120 at step 410. Optionally, the powder may then be settled and fed into a transport container for recycling or reintroduction into the virgin powder supply at step 412. Such recycling and reuse may occur either at a separate location or locally. In embodiments, the powder is transferred via tubing or other structure rather than using a discrete transport container.

In the embodiment of FIG. 11*b*, the one or more apparatuses 102 comprise at least six reclaim ports 502 through which overspray is evacuated. The method 1100 begins as step 1102 when powder over sprays, or is not electrostatically seated on the medium 1502. Attached to each respective reclaim port 502 is a reclaim duct 504. Each reclaim duct 504 connects to one or more bag houses 1108.

In step 1104, the overspray powder is drawn into the reclaim ducts 504 by a VFD Blower Motor 1110. The overspray collection system 500 comprises blowback dampers 1106 to prevent the overspray from traveling backwards towards the apparatuses 102 in the event that the bag house(s) 1108 are destroyed. The bag house(s) 1108 comprise non-conductive filter bags which are pulsed with air and any free powder falls into the collectors 1114. The bag house(s) 1108 include a knife gate which is capable of blocking overspray to allow for a collector 1114 to be changed. The VFD blower motor 1110 creates the negative pressure which draws the overspray 1102 to and through the bag house(s) 1108 and its filters. The overspray powder is vented into the atmosphere 1112.

In this embodiment, the electrostatic coating system 100 has two-color application capability, enabling the apparatuses 102 to apply single or two color paint and the overspray collection system allows for the colors to be collected independently from the apparatuses 102. The apparatuses 102*a*, 102*b* are applied oppositely and facing one another. One apparatus applies the mixture to the top side of the medium 1502 and the opposite apparatus applies the mixture to the bottom side of the medium 1502. These apparatuses 102*a*, 102*b* allow application of the mixture on each side of the medium 1502 simultaneously.

In an embodiment, the electrostatic coating system 100 is configured to implement a cleaning mode wherein all air and residual powder are completely evacuated from within the shroud. Such mode may be used, for example, prior to retracting the shroud to inspect the oven 106 and/or apparatuses 102. Further, during regular operation, the electrostatic coating system 100 may be configured to evacuate only the motive gas and excess powder material from the shroud (e.g., so as to collect overspray as it occurs).

Powder Management System

Figure 12:
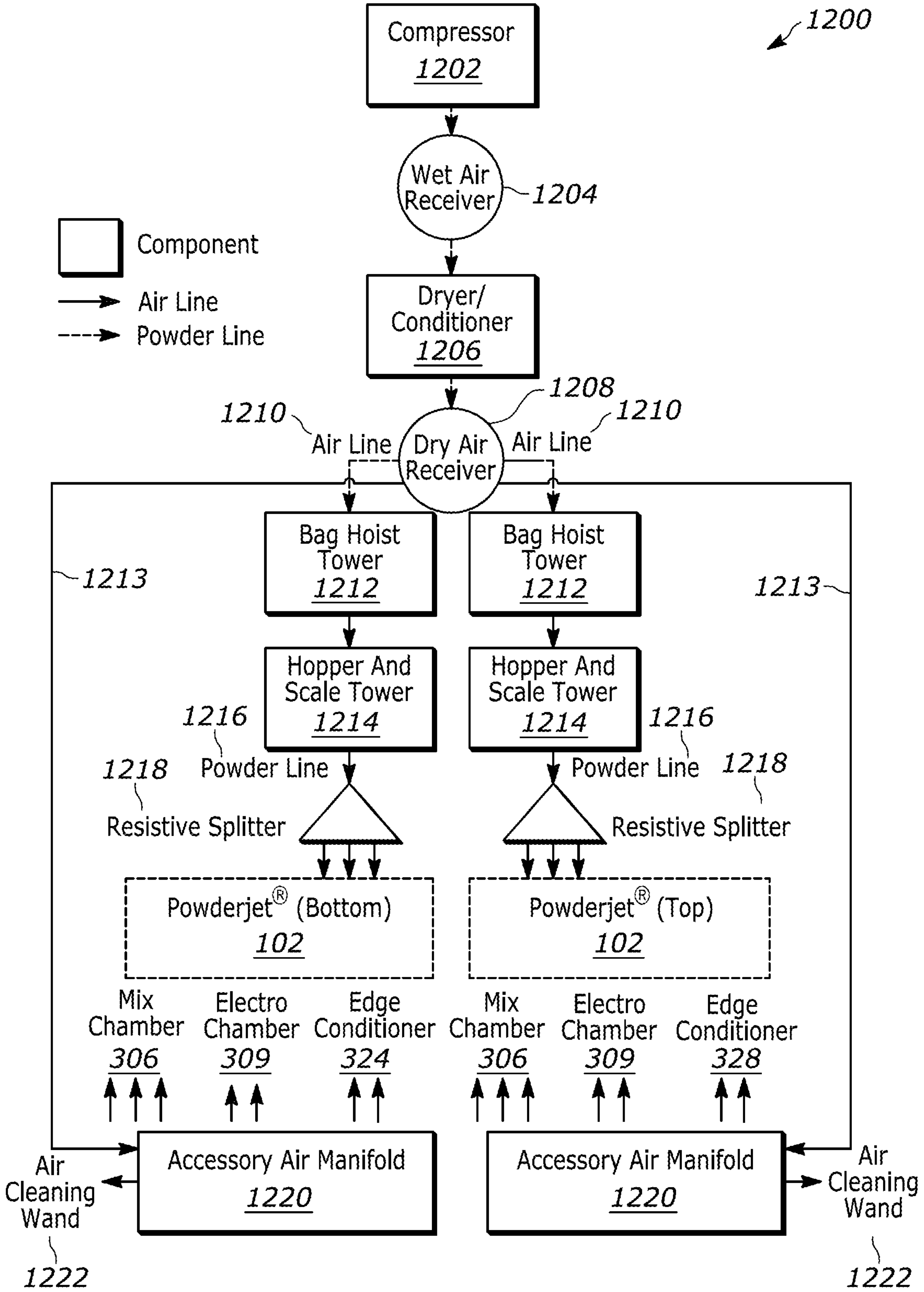
FIG. 12 is a diagram of a powder management system.
Figure 14:
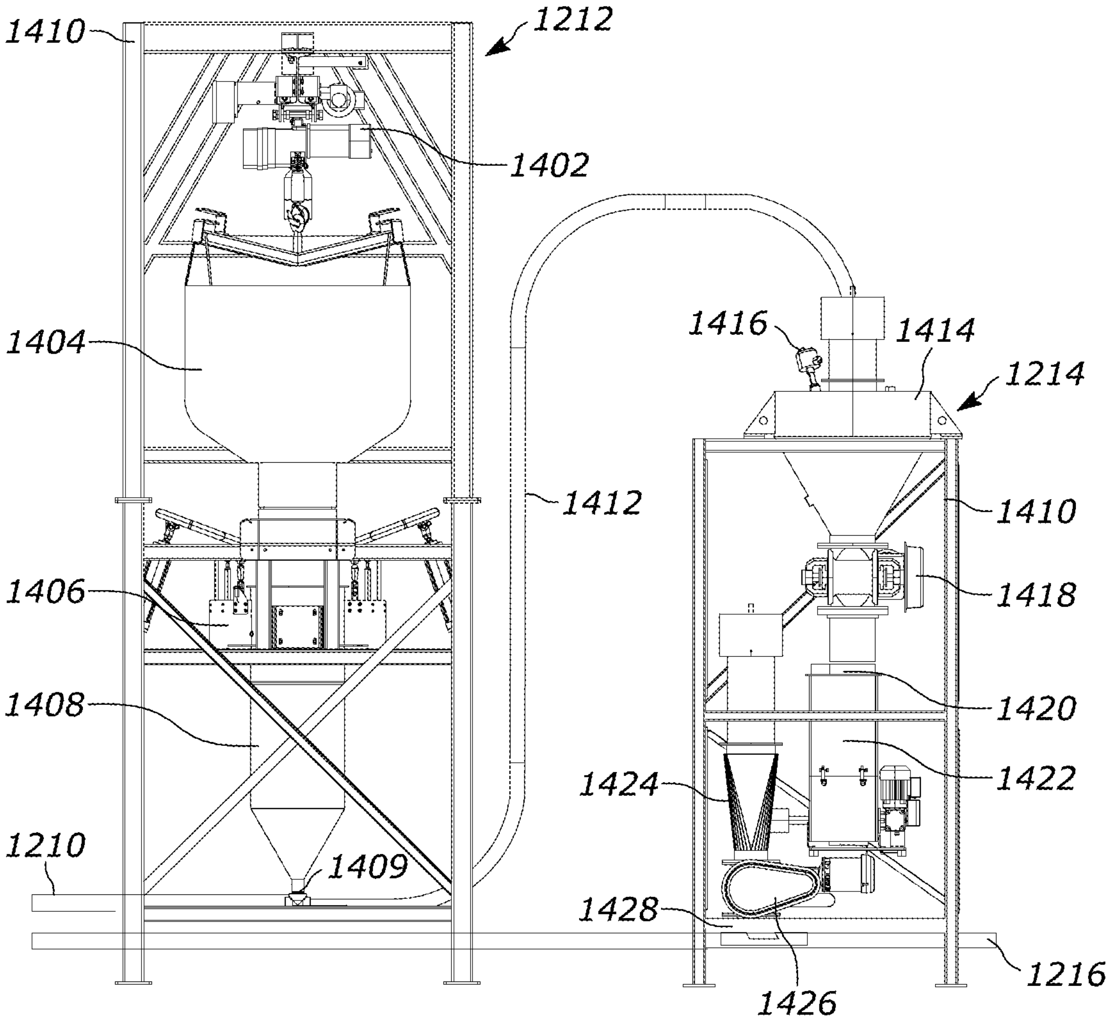
FIG. 14 is a front view of the Bag Hoist Tower and Hopper and Scale Tower shown in FIG. 13.
Figure 15:
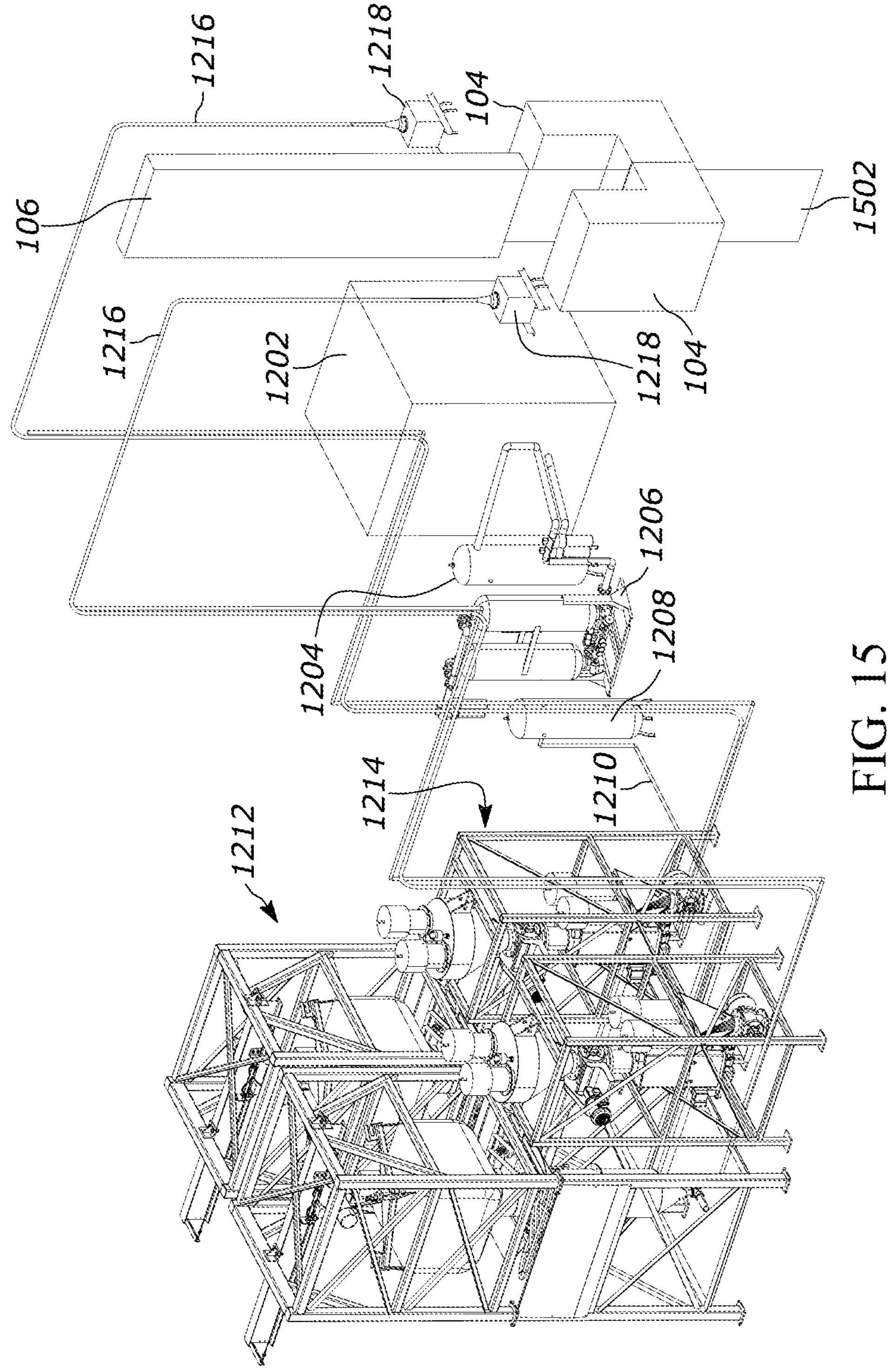
FIG. 15 is a perspective view of an alternate arrangement of the powder management system of FIG. 12 and the electrostatic coating system of FIG. 1*a;*

FIGS. 12 and 15 depict a powder management system 1200 connected to an electrostatic coating system 100. Specifically, FIGS. 13 and 14 depict components of the powder management system 1200.

Figure 13:
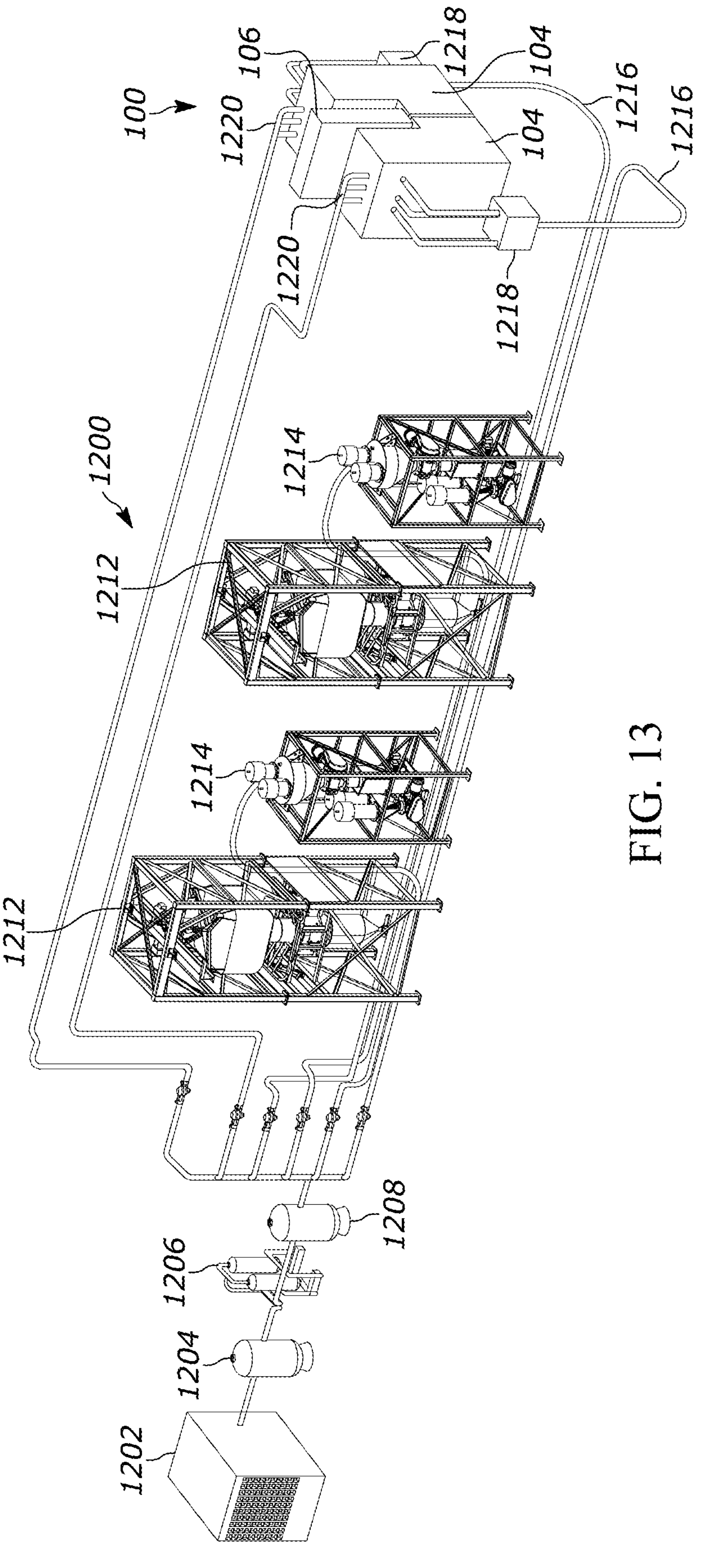
FIG. 13 is a perspective view of the powder management system of FIG. 12 and the electrostatic coating system of FIG. 1*a;*

As shown in FIGS. 12 and 13, the powder management system 1200 comprises a compressor 1202 that provides compressed air to a wet air receiver 1204. The compressed air then is fed to a dryer/conditioner 1206 (e.g., a desiccant air dryer) before being passed to a dry air receiver and/or air controls panel 1208 where it is stored until needed.

In the embodiments shown, the foregoing components are common to all apparatuses 102 in the facility. As shown, each separate apparatus 102 is then fed by a distinct supply comprising an air line 1210 from the dry air receiver/air controls panel 1208 to a bag hoist tower 1212, which is itself coupled in turn to a hopper and scale tower 1214, a powder line 1216, and a splitter 1218 (such as, in embodiments, a resistive splitter). In addition, each apparatus 102 is fitted with a separate accessory air manifold 1220 that receives dry air from the dry air receiver/air controls panel 1208 via an air supply line 1213 and provides air to the mixing chamber 306, electrostatic/vacuum chamber 309, and edge conditioner 328 of the apparatus 102 along with air to a separate air cleaning wand 1222 (which may be used, for example, for cleaning the electrostatic coating system 100).

The powder management system 1200 provides a desired amount of powder paint to the apparatuses 102*a*, 102*b*. The hopper stores a volume of powder and delivers the powder to the scale tower 1214 prior to feeding the powder into the apparatuses 102*a*, 102*b*. The splitter 1218 evenly distributes the powder to the mixing chamber 306 for consistency and to enable even distribution of the mixture to a medium 1502. Specifically, the splitter 1218, splits the incoming mixture to distribute an even volume of powder throughout the apparatuses 102*a*, 102*b* such that a uniform film is applied across the width of the medium 1502. Other arrangements are also contemplated. These components are discussed in turn below.

Bag Hoist Tower and Hopper and Scale Tower

FIG. 14 depicts embodiments of a bag hoist tower 1212 and a hopper and scale tower 1214. The elements of each tower 1212, 1214 are supported by a truss system 1410. Air is received at the bag hoist tower 1212 via supply line 1210. At the bag hoist tower 1212, the air is mixed with powder initially contained in bulk bag 1404 suspended from a hoist with a power trolley 1402. The air/powder mixture is pumped by an educator 1409 through a hose 1412 to the hopper and scale tower 1214. The hoist tower 1212 further comprises one or more seal plate confinement boxes 1406 and a confinement box extension 1408.

The air/powder mixture is received at a surge hopper 1414 in the hopper and scale tower 1214. A probe 1416 is provided to monitor the contents of the surge hopper 1414. The mixture passes through a first rotary airlock 1418, a dust collection mechanism 1420, a loss in weight feeder 1422, and a second rotary airlock 1426 before being sent to an apparatus 102*a*, 102*b* by a second educator 1428 via powder supply line 1216. In parallel with the main dust path, the hopper and scale tower 1214 further comprises a vent hopper 1424 which assists with dust collection and removal. The first and second rotary airlocks 1418, 1426 control fill of powder (ensuring that a continuous flow of the desired flow rate is provided to the apparatus 102*a*, 102*b*).

The two-tower approach enables a continuous powder flow, even when replacing powder bags in the bag hoist tower 1212. Further, by separating components into multiple towers, facility space may be used more efficiently and components may be more easily accessed (rather than requiring a single, taller tower). Other arrangements in which the towers are combined are also contemplated.

It is understood that while one possible air mixing configuration is shown any configuration where gas can be used, funneled, and directed to fluidize the powder into suspended particles is contemplated.

Controller

Figure 16A:
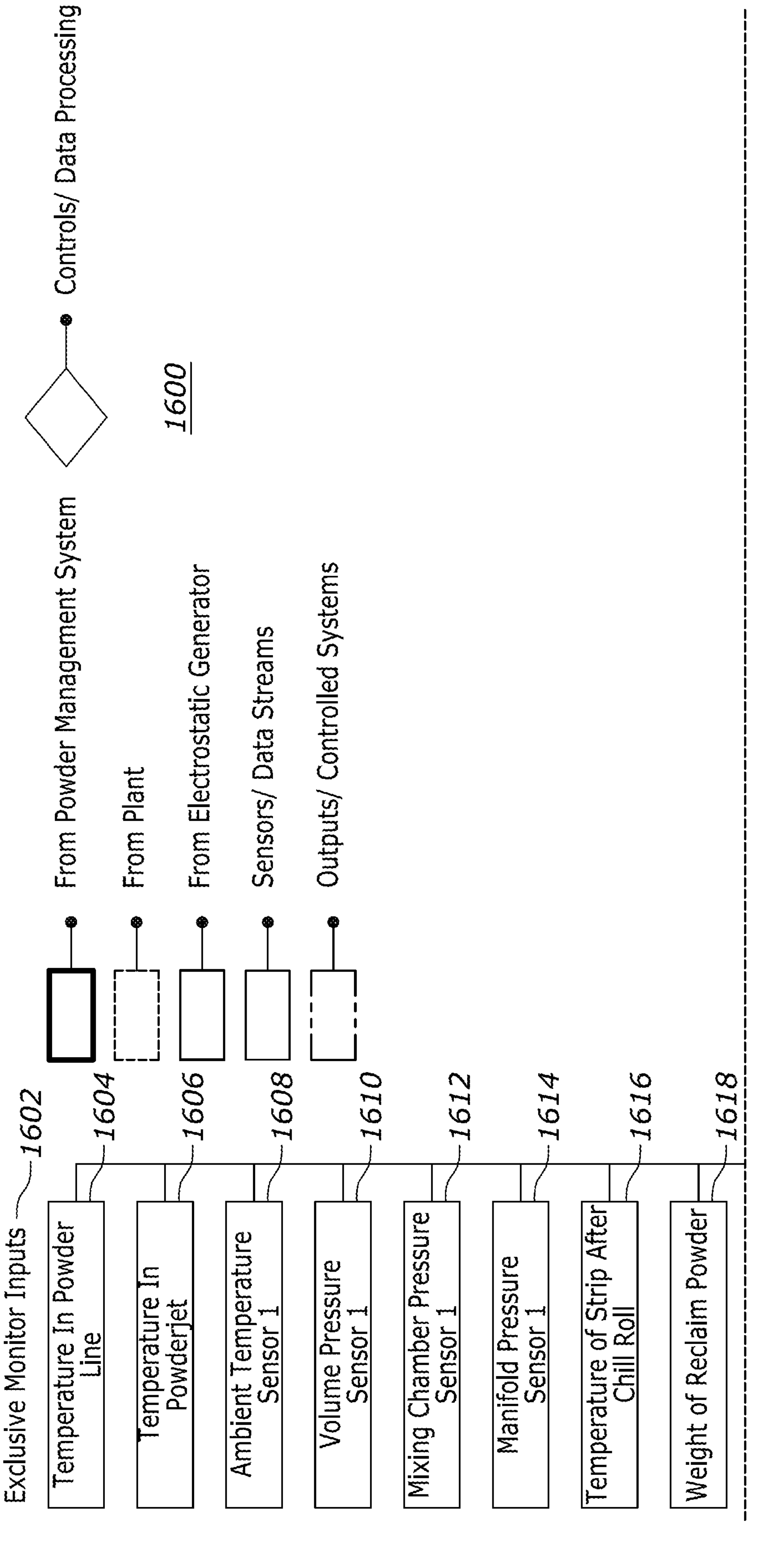
FIG. 16*a* is the first portion of a process flow diagram of a control system.
Figure 16B:
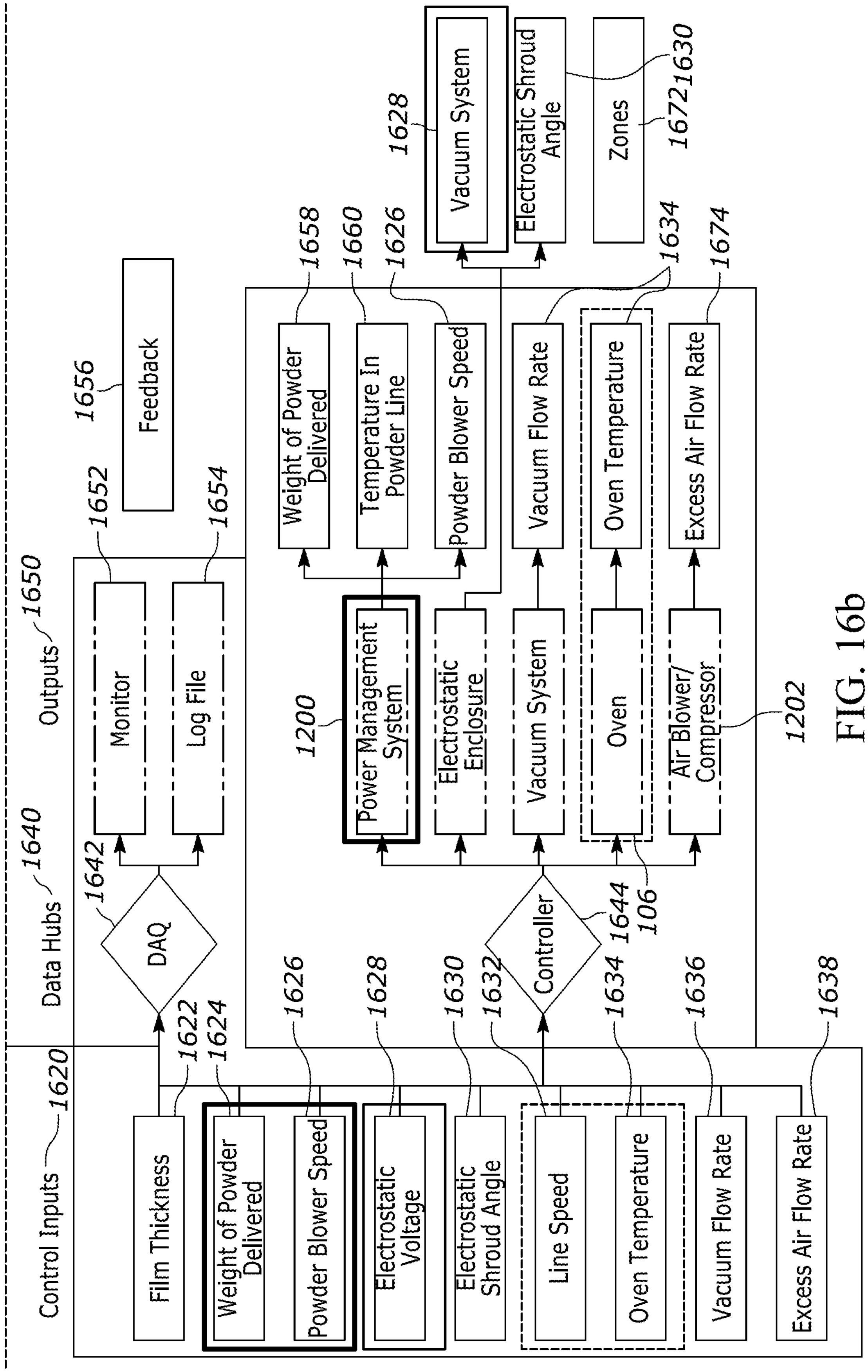
FIG. 16*b* is the second portion of a process flow diagram of a control system.

FIG. 16 provides a process flow diagram of an embodiment of a controller system 1600 for the powder management system 1200 and electrostatic coating system 100.

The controller system 1600 may comprise as executable instructions stored on non-transitive memory for execution by one or more processors contained in one or more computers. Alternatively, the control system 1600 may comprise programmable logic gates or specialized hardware devices. As will be clear to one of ordinary skill in the art, the controller could also be implemented using other architectures and individual components may be software and/or hardware based.

As shown, the control system 1600 comprises one or more data hubs 1640 that receive control inputs 1620 and, based on those control inputs 1620, generate outputs 1650 leading to feedback 1656 that is processed along with further control inputs 1620 to refine decisions and optimize performance of the electrostatic coating system.

In the embodiment shown, the control inputs 1620 comprise a plurality of monitor-only inputs (exclusive monitor inputs) 1602 which act as variables that are not directly adjusted by the controller in the embodiment shown. As will be clear to one of ordinary skill in the art, many of the monitor-only inputs 1602 may be controlled to an extent in alternative embodiments (such as, for example, by adding additional temperature regulation devices). The monitor-only inputs 1602 comprise the measured temperature 1604 in the powder line 1216 (which may be measured using a temperature probe), the temperature 1606 in each apparatus 102*a*, 102*b*, the measured ambient temperature 1608 proximate the electrostatic coating system 100 and powder management system 1200, the measured pressure 1610 in the volute 308, the measured pressure 1612 in the mixing chamber 306, the measured pressure 1614 in one or more of the mini manifolds 200, the measured temperature 1616 of the medium 1502, and the measured weight 1618 of reclaimed powder.

In addition, the control inputs 1620 comprise a plurality of variables that are directly adjusted and optimized by the controller, including the measured film thickness 1622 applied to the medium 1502, the measured weight 1624 of powder delivered to each apparatus 102, the speed 1626 of each powder blower delivering powder, the electrostatic voltage 1628 at each electrostatic emitter bar 314 (or, in an embodiment, each individual electrostatic emitter), the rotational angle 1630 of each electrostatic emitter bar 314, the line speed 1632 of the medium 1502 passing through the system 100, the measured temperature 1634 of the oven 106, the measured vacuum flow rate 1636, and the measured excess air flow rate 1638. The control system 1600 functions to monitor and modify operating conditions based on film thickness 1622 and uniformity as well as other predetermined variables and parameters.

The control system 1600 monitors inputs 1602 and adjusts outputs to optimize the accuracy and distribution of coating to the medium 1502. For example, adjustments to the rotation or angle 1630 of the electrostatic emitter bar(s) 314 impact the distribution of coating along the medium. This is similarly the case for other control outputs directed by the controller.

In the embodiment shown, various of the control inputs 1620 are processed by individual data hubs 1640. As shown, all of control the inputs 1620 are processed by a data acquisition system (DAQ) 1642 which displays results on one or more monitors 1652 (which may be physical displays and/or graphical user interfaces available on discrete devices) and generates a log file 1654 for later analysis.

Figure 17A:
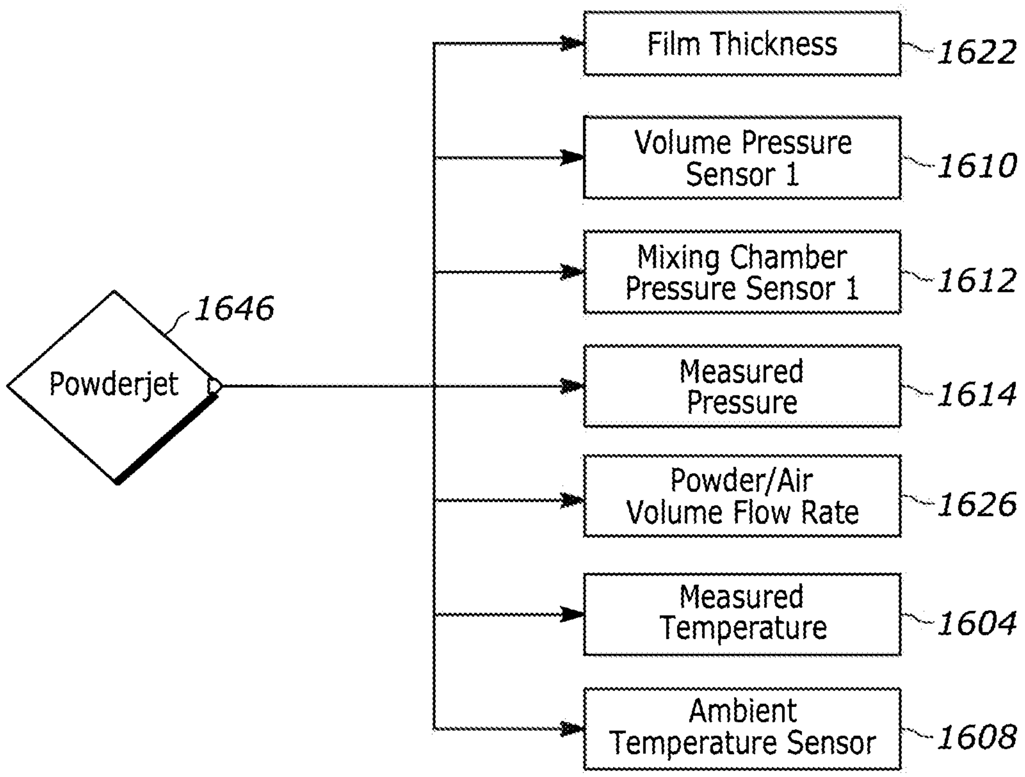
FIG. 17*a* is a process flow diagram of an apparatus of FIG. 1*a;*
Figure 17B:
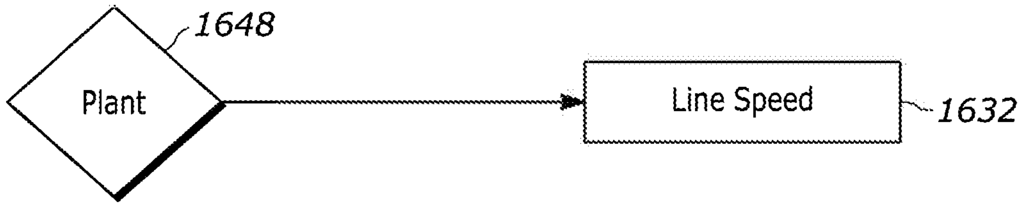
FIG. 17*b* is a process flow diagram of a plant containing the system of FIG. 1*a;*

The controller 1644 similarly receives all of the control inputs 1620 for use in adjusting various outputs 1650. In the embodiment shown, the controller 1644 adjusts parameters of the powder management system 1200 including the weight of powder delivered 1658 (which directly affects the measured weight 1624 of powder delivered), the temperature 1660 in the powder line 1216 which may be controlled by a heating and/or cooling system and directly affects the measured temperature 1604, and the powder blower speed 1626. The controller 1644 similarly adjusts the electrostatic voltage 1628 at each electrostatic emitter bar 314 (or, in an embodiment, each individual electrostatic emitter) and the rotational angle 1630 of each electrostatic emitter bar 314 in the electrostatic enclosure 309. The controller 1644 is configured to change the vacuum flow rate 1636 of the vacuum system (not shown), the temperature 1634 of the oven 106 (which may be independently controlled in various zones 1672), and the excess air flow rate 1674 of the air blower/compressor 1202. These varied inputs are then received as feedback 1656 used to make further adjustments As shown in FIGS. 17*a* and 17*b*, the apparatuses 102*a*, 102*b* may comprise a local controller 1646 that is responsible for receiving instructions from the controller 1644 and adjusting local variables and make local measurements. As shown, the plant interface 1648 controls the line speed 1632 functions.

The invention as disclosed herein is not limited to the particular details of the described electrostatic coating apparatus, and other modifications and applications may be contemplated. Further changes may be made in the above-described method and device without departing from the true spirit and scope of the invention herein involved. It is intended, therefore, that the subject matter in the above disclosure should be interpreted as illustrative, not in a limiting sense.

Figure 18A:
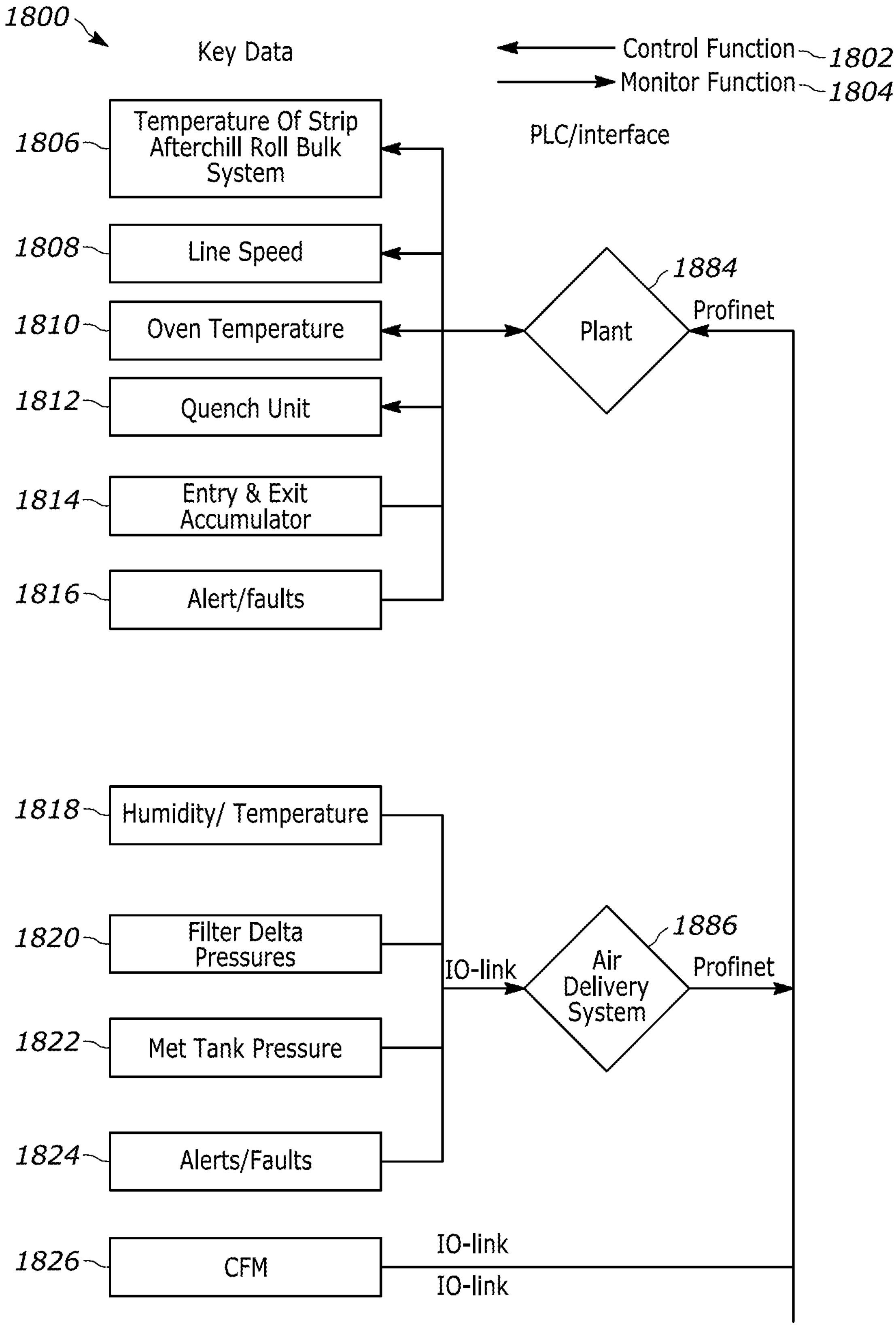
FIG. 18*a* is the first portion of a process flow diagram of a second embodiment of a control system.
Figure 18B:
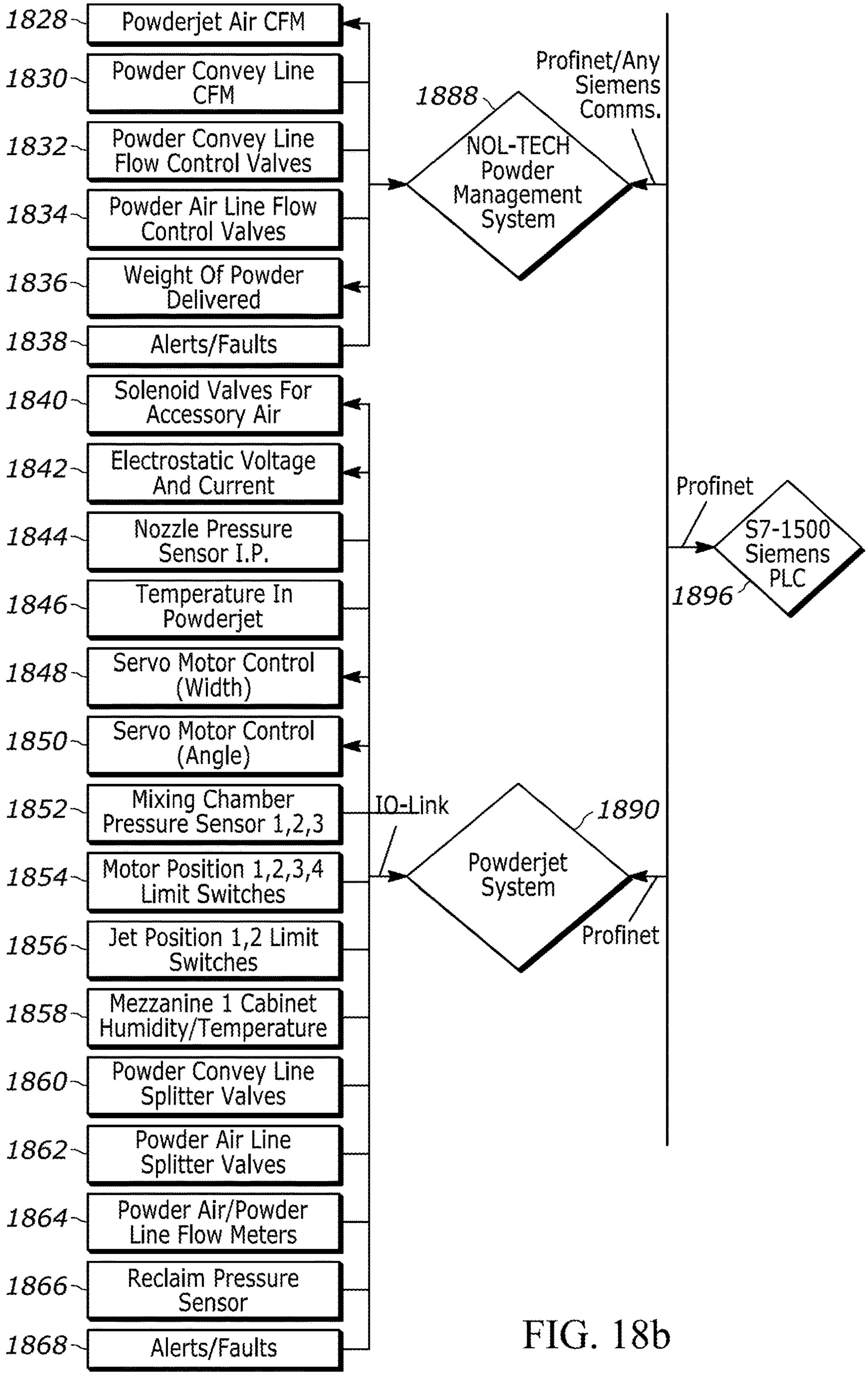
FIG. 18*b* is the second portion of a process flow diagram of a second embodiment of a control system.
Figure 18C:
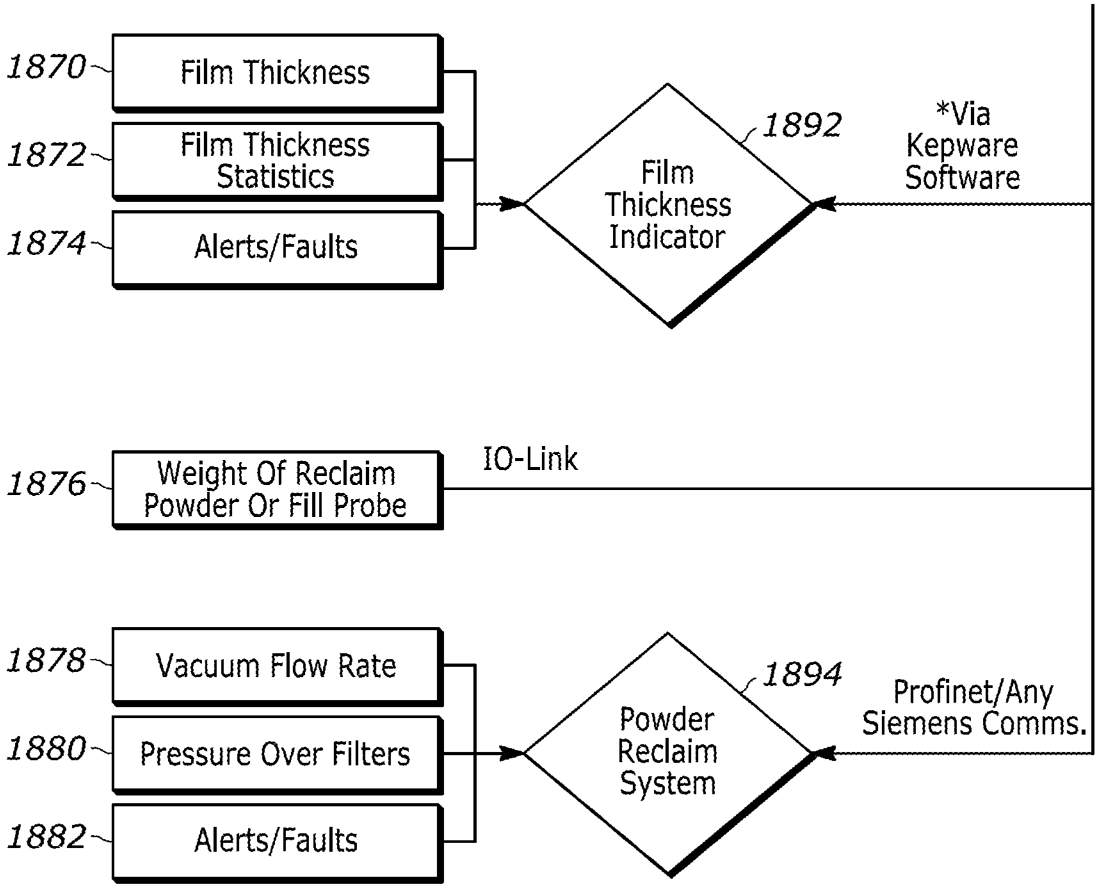
FIG. 18*c* is the third portion of a process flow diagram of a second embodiment of a control system.
Figure 19:
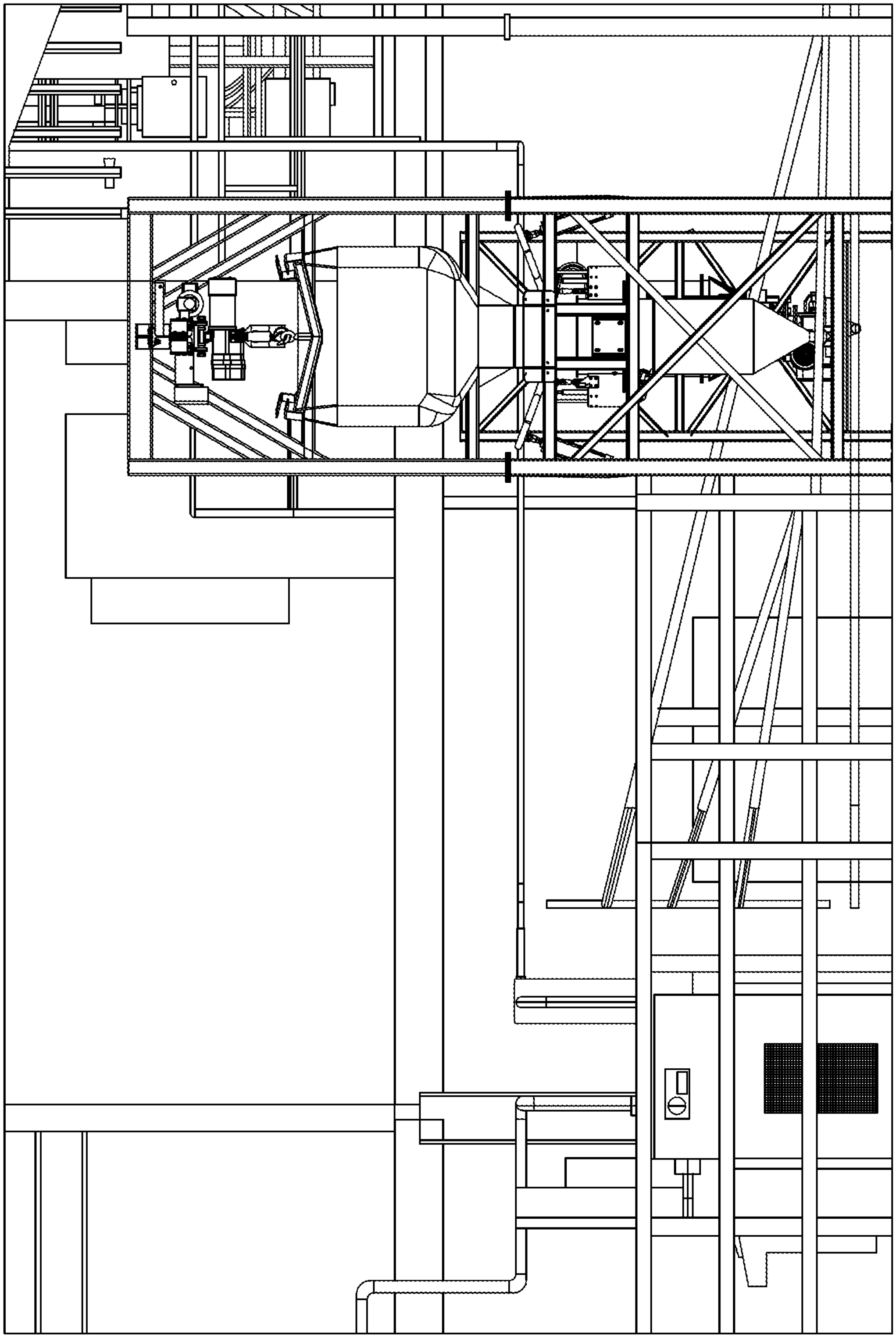
FIG. 19 is a side view of the electrostatic coating system and all of its components.
Figure 20:
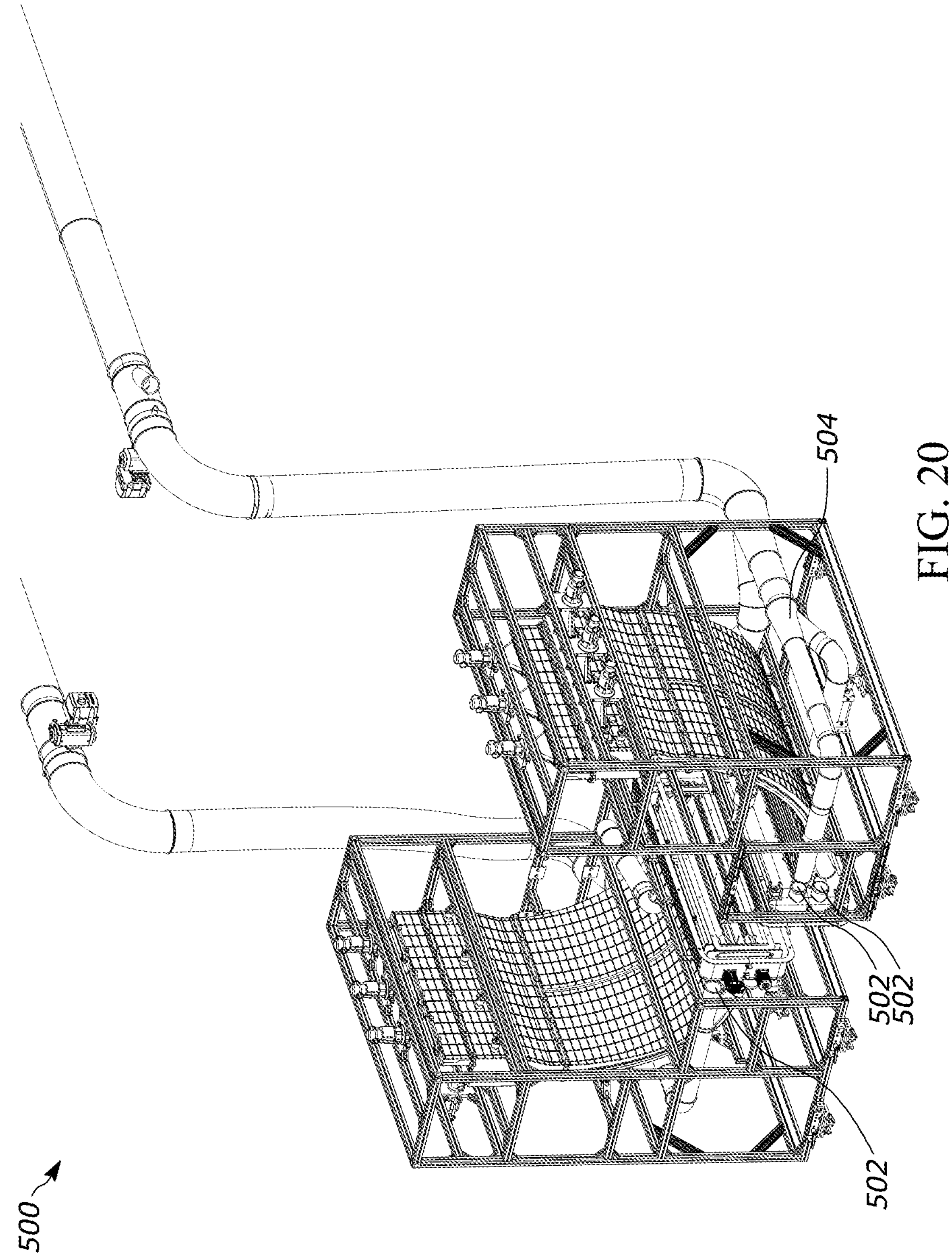
FIG. 20 is a perspective view of the overspray collection system within the electrostatic coating system of FIGS. 1*a* and 1*b*.
Figure 21:
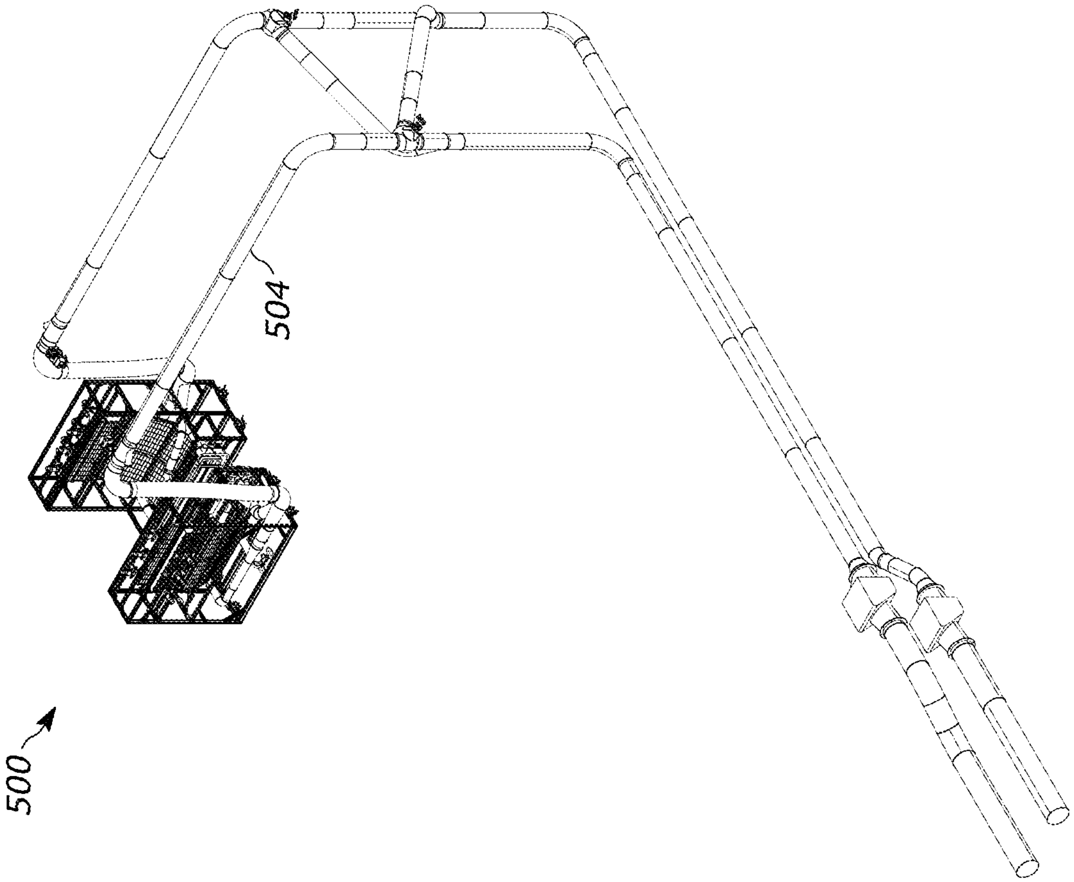
FIG. 21 is an expanded view of reclaim ducts within the overspray collection system of FIG. 20.

FIGS. 18*a*-18*c* provide a process flow diagram of a second embodiment of a controller system 1800.

As shown, the control system 1800 comprises one or more interfaces 1884-1894 that control 1804 or monitor 1802 key data 1806-1882, which are in turn controlled 1804 and monitored 1802 by the S7-1500 SIEMENS PLC 1896.

As shown, the plant interface 1884 monitors the temperature of strip after chill roll bulk system 1806, entry and exit accumulator 1814, and alert/faults functions 1816. The plant interface 1884 controls and monitors the line speed 1808, oven temperature 1810, and quench unit 1812 functions.

As shown, the air delivery system 1886 monitors the humidity/temperature 1818, filter delta pressures 1820, wet tank pressures 1822, and alerts/faults 1824 functions.

As shown, the S7-1500 SIEMENS PLC 1896 directly monitors the CFM 1826 and weight of reclaim powder or fill probe 1876 functions.

As shown, the NOL-TECH powder management system interface 1888 monitors the powder convey line CFM 1830, the powder convey line flow control valves 1832, powder air line flow control valves 1834, and alerts/faults 1838. The NOL-TECH powder management system interface 1888 controls and monitors the Powderjet Air CFM 1828 and weight of powder delivered 1836.

As shown, the Powderjet System interface 1890 monitors the nozzle pressure sensor 1844, temperature within the Powderjet 1846, mixing chamber pressure sensors 1852, motor position limit switches 1854, jet position limit switches 1856, mezzanine 1 cabinet humidity/temperature 1858, powder convey line splitter valves 1860, powder air line splitter valves 1862, powder air/powder line flow meters 1864, reclaim pressure sensor 1866, and alerts/faults 1868. As shown, the Powderjet System interface 1890 controls and monitors solenoid valves for accessory air 1840, electrostatic voltage and current 1842, and servo motor control (width) 1848, servo motor control (angle) 1850 functions.

As shown, the Film Thickness Indicator interface 1892 monitors the film thickness 1870, film thickness statistics 1872, and alerts/faults 1874 functions.

As shown, the Powder Reclaim System 1894 monitors the vacuum flow rate 1878, pressure over filters 1880, and alerts/faults 1882 functions.

What is claimed is:

1. An electrostatic coating system comprising:

a plurality of electrostatic coating apparatuses, each comprising:

a frame;

a plurality of mini manifolds, wherein each of the mini manifolds comprises an inlet, an initial chamber, a nozzle, and a mini manifold outlet, wherein the inlet functions as an inlet for air or powder particles, and the mini manifold outlet functions as an outlet for the air or the powder particles;

a mixing chamber, the mixing chamber receiving the air and the powder particles from the mini manifold outlets and intermixing and fluidizing the air and the powder particles to form a fluidized mixture;

a volute, the volute guiding the fluidized mixture of particles from the mixing chamber to an electrostatic vacuum chamber and through an outlet, wherein the outlet is flanked by a plurality of electrostatic emitter bars that generate an electrostatic field to propel the fluidized mixture of particles onto a medium;

an oven located above and between a first electrostatic coating apparatus and a second electrostatic coating apparatus of the plurality of electrostatic coating apparatuses, the oven used for curing the medium;

an enclosure housing the pneumatic controls and powder supplies of the first and second electrostatic coating apparatus;

a powder management system operatively connected to the first electrostatic coating apparatus and configured to provide a powder and an air supply to the first electrostatic coating apparatus; and a controller operatively connected to the first electrostatic coating apparatus and the powder management apparatus and configured to control a first variable of the first electrostatic coating apparatus and a second variable of the powder management system.

2. The electrostatic coating system of claim 1 further comprising:

an overspray collection system comprising:

a collection unit to collect particle overspray which is not electrostatically seated on the medium, the collection unit including a shroud to prevent overspray from escaping the spray area and a vacuum motor to ingest the overspray;

a cyclone separator, which receives the particle overspray from the vacuum motor and separates the air from the powder;

a vent, which filters and vents the air outside the shroud; and a collection container to collect the leftover powder.

3. The electrostatic coating system of claim 1, wherein the one or more electrostatic coating apparatuses further comprises an overspray collection unit, the overspray collection unit comprising:

a plurality of reclaim ports to collect particle overspray, a plurality of reclaim ducts to connect each reclaim port to a corresponding bag house, the bag house comprising non-conductive filter bags and a knife gate to control the flow of particle overspray to the bag house, a blower to draw overspray particles into the plurality of reclaim ports and to the bag houses;

blowback dampers to precent overspray from traveling back from the bag houses towards the reclaim ports;

a vent, which filters and vents the air into the atmosphere; and a means for providing a blast of air to pulse the bag houses to release leftover powder particles into a collector.

4. The electrostatic coating system claim 3, wherein the electrostatic coating system has two-color application capacity to apply a single or two color coating to the medium and the overspray collection system collects the two color overspray independently without mixing the colors.

5. The electrostatic coating system of claim 1, wherein the enclosure further comprises:

an outer surface comprised of a top panel, bottom panel, front panel, pair of side panels, back panel, and header panel removably connected to the frame to conceal and protect the one or more electrostatic coating apparatuses from ambient temperature changes and physical impacts;

wheels attached to the bottom of the enclosure; and a handrail system to retract at least one panel of the outer surface to permit access to the one or more electrostatic coating apparatuses.

6. The electrostatic coating system of claim 5, wherein the electrostatic coating system further comprises a slide along rail system to allow a user to move the one or more electrostatic coating apparatuses away from the oven.

7. The electrostatic coating system of claim 5, wherein a strip shroud further comprises a pneumatic piston system to retract the strip shroud away from the oven.

8. The electrostatic coating system of claim 1, wherein the powder management system comprises:

a compressor that provides compressed air to a wet air receiver;

a dryer which receives and conditions the wet air into dry air and passes the dry air into a dry air receiver;

an air-line to direct the dry air from the dry air receiver to a bag hoist tower to mix the dry air with powder;

an educator to pump the air and powder mixture from the bag hoist tower to a hopper and scale tower which monitors the mixture flow rate and consistency of the mixture;

a powder line which directs the flow of the mixture to the one or more electrostatic coating apparatuses;

and a splitter.

9. The electrostatic coating system of claim 1, wherein the controller comprises one or more data hubs and a control logic to receive and analyze inputs, the one or more data hubs and control logic generating instructions to adjust the parameters of the electrostatic coating system.

10. The electrostatic coating system of claim 1, wherein the mixing chamber further comprises:

a first plurality of openings proximate the back of the mixing chamber for receiving the powder particles from the plurality of mini manifolds; and a second plurality of openings proximate the top of the mixing chamber for receiving the air particles, the second plurality of openings connected to the plurality of mini manifolds by an air extension.

11. The electrostatic coating system of claim 1, wherein the powder particles are comprised of epoxy, polyester, polyurethane, and/or nylon.

12. The electrostatic coating system of claim 1, wherein the plurality of electrostatic coating apparatuses are secured to the frame by a plurality of mounting brackets comprised of metal to reduce the vibration passed between each apparatus and its respective claim.

13. The electrostatic coating system of claim 1, wherein the exterior surfaces of the mixing chamber and the volute comprise a plurality of ridges to provide structural integrity to the mixing chamber and the interior surfaces of the mixing chamber and volute are smooth to ensure the fluidized mixture flows uninterrupted through the chamber.

14. The electrostatic coating system of claim 1, wherein the electrostatic coating system further comprises a pair of width control mechanisms and a pair of width control rails, the width control mechanisms being slidable along the pair of width control rails to block at least a portion of the outlet, thereby adjusting the width of the particle flow from the outlet.

15. The electrostatic coating system of claim 1, wherein the plurality of electrostatic emitter bars are connected to a pair of rotational control mechanisms to permit the plurality of electrostatic emitter bars to rotate.

16. The electrostatic coating system of claim 1, wherein the electrostatic coating system comprises the first electrostatic coating apparatus to coat a top surface of the medium and the second electrostatic coating apparatus to coat a bottom surface of the medium.

* * * * *